United States Patent
Chutinan et al.

(10) Patent No.: US 8,234,647 B1
(45) Date of Patent: Jul. 31, 2012

(54) CHECKING FOR MUTUAL EXCLUSIVENESS OF A SHARED RESOURCE

(75) Inventors: Alongkrit Chutinan, Ashland, MA (US); Zhi Han, Acton, MA (US)

(73) Assignee: The MathWorks, Inc., Natick, MA (US)

( * ) Notice: Subject to any disclaimer, the term of this patent is extended or adjusted under 35 U.S.C. 154(b) by 1055 days.

(21) Appl. No.: 12/171,082

(22) Filed: Jul. 10, 2008

Related U.S. Application Data

(60) Provisional application No. 61/063,293, filed on Jan. 31, 2008.

(51) Int. Cl.
 *G06F 9/46* (2006.01)
(52) U.S. Cl. ........................... 718/102
(58) Field of Classification Search .......... 718/102
 See application file for complete search history.

(56) References Cited

U.S. PATENT DOCUMENTS

| | | | |
|---|---|---|---|
| 5,283,896 A * | 2/1994 | Temmyo et al. | 718/104 |
| 6,457,173 B1 * | 9/2002 | Gupta et al. | 717/149 |
| 6,470,486 B1 * | 10/2002 | Knapp | 716/105 |
| 6,857,082 B1 * | 2/2005 | Josan et al. | 714/4.1 |
| 7,555,418 B1 * | 6/2009 | Qadeer et al. | 703/22 |
| 2002/0004810 A1 * | 1/2002 | Reneris | 709/104 |
| 2002/0095434 A1 * | 7/2002 | Lane | 707/201 |
| 2004/0078618 A1 * | 4/2004 | Moser et al. | 714/3 |
| 2005/0125789 A1 * | 6/2005 | Dijkstra et al. | 718/100 |

OTHER PUBLICATIONS

Y. Xie, W. Wolf. Allocation and scheduling of conditional task graph in hardware/software co-synthesis, Proceedings of the conference on Design, automation and test in Europe, p. 620-625, Mar. 2001, Munich, Germany.*

* cited by examiner

*Primary Examiner* — Idriss N Alrobaye
(74) *Attorney, Agent, or Firm* — Harrity & Harrity, LLP

(57) ABSTRACT

In an embodiment, a technique that may be used to report whether a shared resource in a model is accessed on a mutually exclusive basis by two or more resources in the model. The technique may include identifying the shared resource, determining if the shared resource is accessed on a mutual exclusive basis, generating a result based on the determination, and outputting the result.

21 Claims, 20 Drawing Sheets

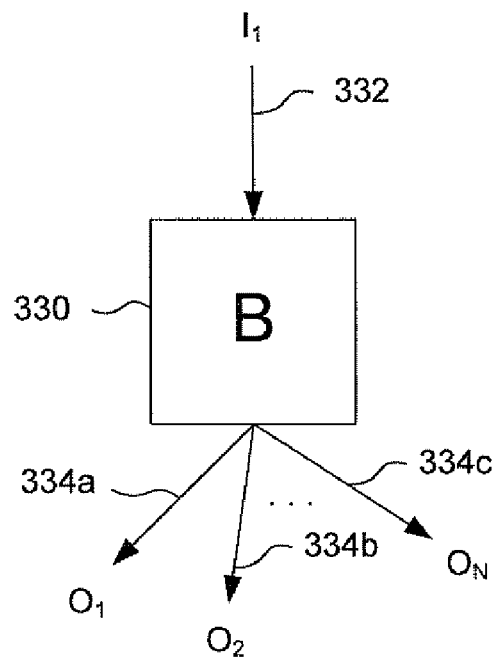

$$336 \begin{cases} B \leftrightarrow I_1 \\ B \rightarrow (O_1 \wedge \neg O_2 \wedge ... \wedge \neg O_N) \vee (\neg O_1 \wedge O_2 \wedge ... \wedge \neg O_N) \vee ... \vee \\ (\neg O_1 \wedge \neg O_2 \wedge ... \wedge O_N) \vee (\neg O_1 \wedge \neg O_2 \wedge ... \wedge \neg O_N) \\ O_1 \rightarrow B \\ O_2 \rightarrow B \\ ... \\ O_N \rightarrow B \end{cases}$$

$$338 \begin{cases} B \leftrightarrow I_1 \\ B \rightarrow (O_1 \wedge \neg O_2 \wedge ... \wedge \neg O_N) \vee (\neg O_1 \wedge O_2 \wedge ... \wedge \neg O_N) \vee ... \vee \\ (\neg O_1 \wedge \neg O_2 \wedge ... \wedge O_N) \\ O_1 \rightarrow B \\ O_2 \rightarrow B \\ ... \\ O_N \rightarrow B \end{cases}$$

FIG. 3D

CHECKING FOR MUTUAL EXCLUSIVENESS OF A SHARED RESOURCE

RELATED APPLICATIONS

This application claims the benefit of U.S. Provisional Application No. 61/063,293, titled "CHECKING FOR MUTUAL EXCLUSIVENESS FOR A SHARED RESOURCE", which was filed on Jan. 31, 2008 and which is hereby incorporated by reference as though fully set forth herein.

BACKGROUND

Modeling environments may include textual modeling environments and/or graphical modeling environments that may be used to generate, compile, and/or execute one or more models that represent systems. Modeling environments may cater to various aspects of dynamic system simulation, analysis and design. Such modeling environments may allow users to perform numerous types of tasks including, for example, constructing and simulating system models.

Some models may include one or more resources that are shared between multiple portions of the model. The sharing of resources in a model may be beneficial in that it may reduce the number of resources required by the model. However, in some circumstances using a shared resource may introduce problems if multiple resources in the model try to access the shared resource at the same time.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 3A-D illustrate examples of firing semantics that may be associated with one or more nodes in an execution control graph;

DETAILED DESCRIPTION

Figure 1:
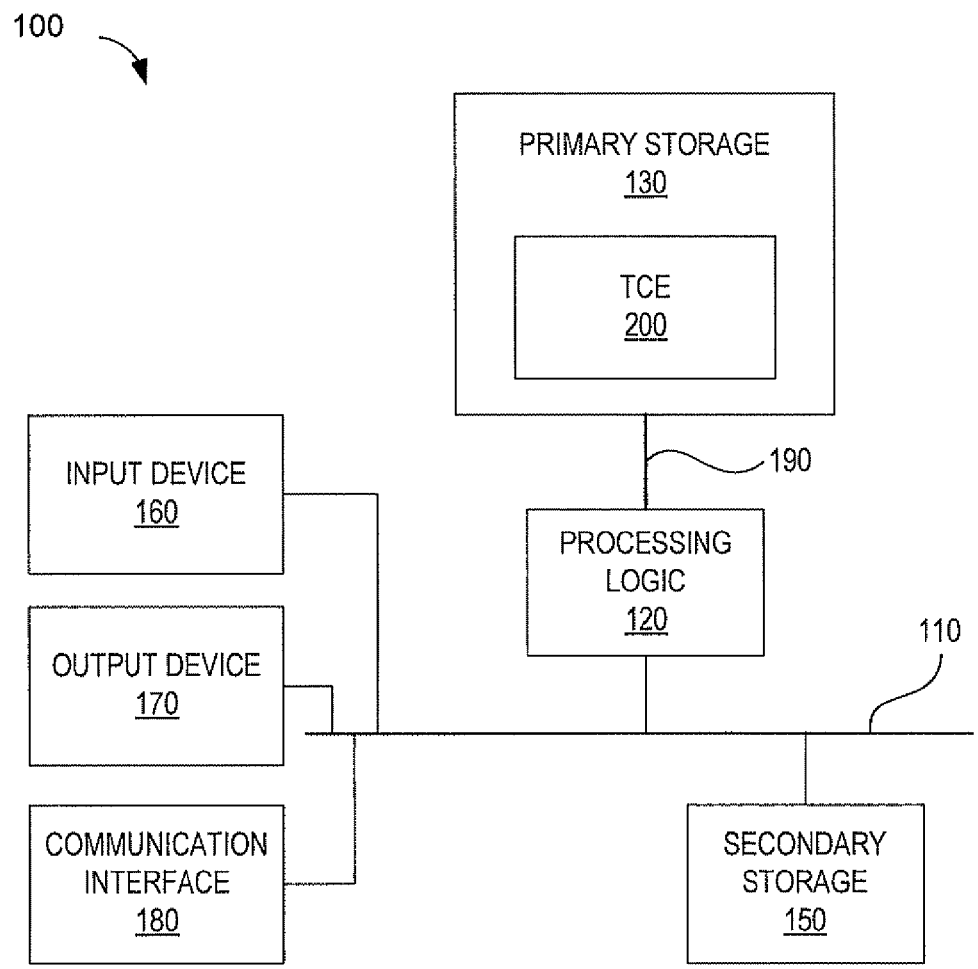
FIG. 1 illustrates an example of a computer system that may be configured to implement one or more embodiments of the invention.

The following detailed description refers to the accompanying drawings. The same reference numbers in different drawings may identify the same or similar elements. Also, the following detailed description does not limit the invention.

As will be described below, a model may comprise one or more blocks that represent functionality and/or data associated with a system. These blocks may be configured to model a system that is represented by the model. The model may be executed under control of a technical computing environment (TCE) to simulate the system.

During execution, certain blocks may generate values and may write those values to blocks in the model. A block in the model that may be written by two or more blocks may be referred to as a shared block. A shared block may be considered a shared resource in the model. A block that writes to the shared resource may be referred to as a writer block.

If during execution two or more writer blocks write values to the shared resource at the same time, access to the shared resource is said to be performed on a non-mutually exclusive basis. In other words, the shared resource is not accessed on a mutually exclusive basis. On the other hand, if during execution two or more writer blocks may not write values to the shared resource at the same time, access to the shared resource is said to be performed on a mutually exclusive basis.

Certain TCEs, such as the Simulink® and MATLAB® environments available from The MathWorks, Inc., Natick, Mass., may be used to generate models that represent systems. The models may be used to help in the design, testing, and implementation of the systems.

Embodiments described herein may include a TCE that may be used to identify a shared resource in a model, determine if two or more resources in the model may access the shared resource on a mutually exclusive basis, generate a result based on the determination where the result indicates whether the shared resource is accessed on a mutually exclusive basis, and output the result (e.g., display the result on a display device, store the result in storage, transfer the result over a network, etc.).

The TCE may include hardware-based and/or software-based logic configured to provide a computing environment that may allow, for example, a user to perform tasks related to disciplines, such as, but not limited to, mathematics, science, engineering, medicine, business, and so on. The TCE may include a dynamically-typed programming language (e.g., the MATLAB® M language) that can be used to express problems and/or solutions in mathematical notations.

For example, the TCE may use an array as a basic element, where the array may not require dimensioning. These arrays may be used to support array-based programming where an operation can apply to an entire set of values included in the arrays. Array-based programming may allow array-based operations to be treated as a high-level programming technique that may allow, for example, operations to be performed on whole aggregations of data without having to resort to explicit loops of individual non-array operations.

In addition, the TCE may be configured to perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, state-based analysis and/or design, and so on.

The TCE may further provide mathematical functions and/or graphical tools or blocks (e.g., for creating plots, surfaces, images, volumetric representations, etc.). The TCE may provide these functions and/or tools using toolboxes (e.g., toolboxes for signal processing, image processing, data plotting, and/or parallel processing). In addition, the TCE may provide these functions as block sets. The TCE may also provide these functions in other ways, such as via a library, local or remote database, and so on.

The TCE may be implemented as a text-based environment, a graphical-based environment, or another type of environment, such as a hybrid environment that includes one or more text-based environments and one or more graphical-based environments. The TCE may include provisions configured to create, compile, execute, and/or interpret the model. The model may be graphical (e.g., an executable block diagram model), textual, or some combination of graphical and textual. Examples of TCEs may include, but not be limited to, MATLAB®, Simulink®, Stateflow®, and SimEvents™ from The MathWorks, Inc.; GNU Octave from the GNU Project; Comsol Script and Comsol Multiphysics from Comsol; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Virtuoso from Cadence; Modelica or Dymola from Dynasim AB; VisSim from Visual Solutions; SoftWIRE by Measurement Computing Corporation; WiT by DALSA Coreco; VEE Pro and SystemVue from Agilent Technologies, Inc.; Vision Program Manager from PPT Vision, Inc.; Khoros from Khoral Research, Inc.; Gedae from Gedae, Inc.; Virtuoso from Cadence Design Systems, Inc.; Rational Rose from International Business Machines (IBM), Inc.; Rhapsody and Tau from Telelogic AB; Ptolemy from the University of California at Berkeley; and aspects of a Unified Modeling Language (UML) or System Modeling Language (SysML) environment.

One or more embodiments of the invention may be implemented on a computer system. The computer system may be, for example, a desktop computer, a laptop computer, a client computer, a server computer, a mainframe computer, a personal digital assistant (PDA), a web-enabled cellular telephone, a smart phone, a smart sensor/actuator, or some other computation and/or communication device.

FIG. 1 illustrates an example of a computer system 100 that may be configured to implement one or more embodiments of the invention. Referring to FIG. 1, the computer system 100 may comprise one or more components including an input-output (I/O) bus 110, processing logic 120, a primary storage 130, a secondary storage 150, an input device 160, an output device 170, a communication interface 180, and a memory bus 190.

The I/O bus 110 may be an interconnect bus configured to enable communication among various components in the computer system 100, such as processing logic 120, secondary storage 150, input device 160, output device 170, and communication interface 180. The communication may include, among other things, the transfer of data and control information between the components.

The memory bus 190 may be an interconnect bus configured to enable information to be transferred between the processing logic 120 and the primary storage 130. The information may include instructions and/or data that may be executed, manipulated, and/or otherwise processed by processing logic 120. The instructions and/or data may be configured to implement one or more embodiments of the invention.

The processing logic 120 may include logic configured to interpret, execute, and/or otherwise process information contained in, for example, the primary storage 130 and/or secondary storage 150. The information may include instructions and/or data associated with one or more embodiments of the invention. The processing logic 120 may comprise a single central processing unit (CPU) (e.g., a single core) or a group of CPUs (e.g., multi-core). Examples of processing logic 120 may include a processor, microprocessor, Field Programmable Gate Array (FPGA), or other types of processing logic that may interpret, execute, manipulate, and/or otherwise process the information. An example of a processor that may be used with embodiments of the present invention includes the Intel® Core™2 processor available from Intel Corporation, Santa Clara, Calif.

The secondary storage 150 may be a computer-readable media that is indirectly accessible to the processing logic 120 via I/O bus 110. The secondary storage 150 may be configured to store information for the processing logic 120. The information may include computer-executable instructions and/or data that may be executed, interpreted, manipulated, and/or otherwise processed by the processing logic 120. The secondary storage 150 may comprise, for example, a storage device, such as a magnetic disk, optical disk, RAM disk, flash drive, etc. The information may be stored on one or more computer-readable media contained in the storage device. Examples of media contained in the storage device may include magnetic discs, optical discs, and memory devices. The information may include computer-executable instructions and data that implement one or more embodiments of the invention.

The input device 160 may include one or more mechanisms that may permit information to be input into the computer system 100. The information may be supplied by a user. The input device 160 may include, for example, a keyboard, mouse, touch sensitive display device, microphone, pen-based pointing device, a biometric input device, etc.

The output device 170 may include one or more mechanisms that may output information from the computer system 100. The output device 170 may include logic that may be directed by, for example, the processing logic 120, to output the information from the computer system 100. The output device 170 may include, for example, a printer, speaker, display device, etc. The display device may be configured to display the information to a user. The display device may include a cathode ray tube (CRT), plasma display, light-emitting diode (LED) display, liquid crystal display (LCD), vacuum florescent display (VFD), surface-conduction electron-emitter display (SED), field emission displays (FED), and so on, that is used to display the information.

The communication interface 180 may include logic configured to interface the computer system 100 with, for example, a communication network and enable the computer system 100 to communicate with entities connected to the network. An example of a computer network that may be used with computer system 100 will be described further below with respect to FIG. 12.

The communication interface 180 may include a transceiver-like mechanism that enables the computer system 100 to communicate with the entities connected to the network. The communication interface 180 may be implemented as a built-in network adapter, network interface card (NIC), Personal Computer Memory Card International Association (PCMCIA) network card, card bus network adapter, wireless network adapter, Universal Serial Bus (USB) network adapter, modem or other device suitable for interfacing the computer system 100 to the network.

The primary storage 130 may comprise one or more computer-readable media configured to store information for processing logic 120. The primary storage 130 may be directly accessible to the processing logic 120 via bus 190. Information stored by primary storage 130 may include computer-executable instructions and/or data that are configured to implement TCE 200. The instructions may be executed, interpreted, and/or otherwise processed by processing logic 120. TCE 200 may be a technical computing environment configured to implement one or more embodiments of the invention. An example implementation of TCE 200 will be described further below with respect to FIG. 2.

The primary storage 130 may comprise a random-access memory (RAM) that may include RAM devices configured to store the information. The RAM devices may be volatile or non-volatile and may include, for example, dynamic RAM (DRAM), flash memory, static RAM (SRAM), zero-capacitor RAM (ZRAM), twin transistor RAM (TTRAM), read-only memory (ROM), ferroelectric RAM (FeRAM), magnetoresistive RAM (MRAM), phase change memory RAM (PRAM) devices, etc.

Figure 2:
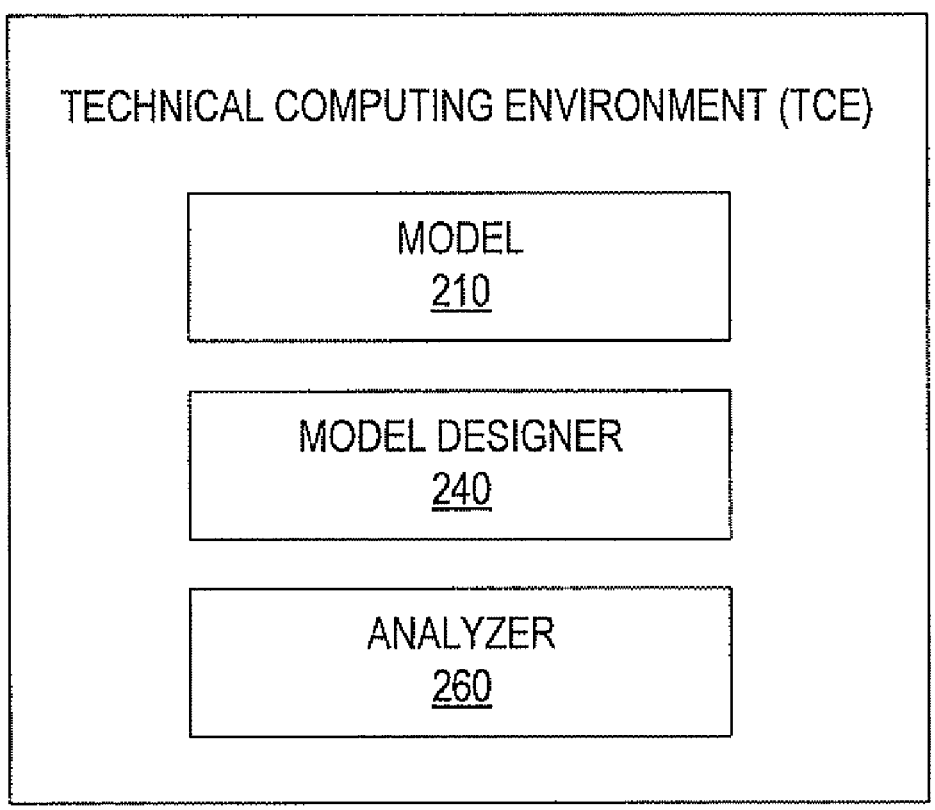
FIG. 2 illustrates an example of a technical computing environment (TCE) that may be configured to implement one or more embodiments of the invention.

FIG. 2 illustrates an example implementation of TCE 200. Referring to FIG. 2, the TCE 200 may comprise various components including model 210, model designer 240, and analyzer 260. As will be described further below, TCE 200 may be configured to construct model 210, and analyze the model 210 to (1) identify a shared resource in the model 210, (2) determine if the shared resource is accessed on a mutually exclusive basis by two or more resources in the model 210, (3) generate a result that indicates whether the shared resource is accessed on a mutually exclusive basis, and (4) output the result.

The model 210 may be, for example, a graphical model (e.g., an executable block diagram model), a textual model, or some combination of graphical and textual model. The model 210 may be used to represent and model a system in the TCE 200. For example, the model 210 may be an executable block diagram model that may be generated using a TCE that supports a block diagram environment, such as Simulink®. Likewise, for example, the model 210 may be an executable textual model that may be generated using a TCE that supports text-based models.

The system modeled by model 210 may be a linear or a non-linear system. Examples of systems that may be modeled by the model 210 may include audio systems, avionics systems, test and measurement systems, computer-based systems, automotive systems, or other systems. The system modeled by model 210 may be a dynamic system. It should be noted, however, that model 210 is not limited to representing dynamic systems. Model 210 may represent other types of systems, such as, for example, a modified data flow system where a block in the model may represent a shared resource that executes when a token is received by any of the block's inputs.

The model 210 may be configured to implement one or more functions associated with the system. The functions may be associated with one or more components of the system and may be configured to implement relationships between the components and behaviors of the components within the modeled system. The functions may be implemented in software that may include code and/or data. The software may be written in a language that may be a computer language (e.g., C, C++, Java), an array-based language (e.g., MATLAB® M-Code), or some other type of language. The language may be configured to support various programming paradigms, such as imperative programming, declarative programming, or some other programming paradigm. The software may be compiled, interpreted, and/or executed by the TCE 200.

The model designer 240 may be configured to enable, e.g., a user, to specify a design of the model 210. The model designer 240 may generate and/or modify the model 210 based on the specified design. The model designer 240 may contain a graphical and/or textual based interface that may be used to specify the model's design. The model's design may be specified using one or more blocks that may represent functionality and/or data associated with the system represented by the model 210. The blocks may be connected to show/establish one or more relationships between the blocks.

As used herein, a block that is part of a model may generally refer to a portion of functionality that may be used in the model. The block may be graphically represented, however, it can be appreciated that the block does not necessarily need to be represented graphically. For example, the block may be represented textually. Also, a particular visual depiction used to represent the block is generally an arbitrary design choice.

The block may be hierarchical in that the block itself may comprise one or more blocks (sub-blocks) that make up the block. A block comprising one or more sub-blocks may be referred to as a subsystem block. A subsystem block may be configured to represent a subsystem of the overall system represented by the model 210. The model designer 240 may be configured to allow subsystem blocks to be selected and drilled down into in order to view the sub-blocks that make up the subsystem block.

The block may be associated with one or more run-time methods which may include methods that may be configured to output information, update state associated with a model, process derivatives, etc. The methods may provide a means by which the model is executed by a TCE. The methods may be responsible for writing signals associated with the model, advancing states associated with the model, etc. The methods may be executed by the TCE in a simulation loop, by type, using block method execution lists. Execution of the block may include performing one or more run-time methods associated with the block.

The model designer 240 may also be configured to model, simulate, and/or analyze systems represented by the model 210. The system may be simulated by executing, interpreting, etc. the model 210. The system may be simulated in continuous time, sampled time, or a hybrid of the two. Moreover, the model designer 240 may be configured to simulate the system using discrete event simulation (DES) techniques.

The analyzer 260 may be configured to analyze model 210 to determine if a shared resource in model 260 is accessed on a mutually exclusive basis. As will be described further below, the analysis may involve (1) identifying the shared resource, (2) determining if the shared resource is accessed on a mutually exclusive basis by one or more resources in the model 210, (3) based on the determination, generating a result that indicates whether the shared resource is accessed on a mutually exclusive basis, and (4) outputting the result (e.g., display the result on a display device, store the result in storage, transfer the result to some device over a network, etc.).

As will be described further below, an execution control graph may be used to represent an execution sequence of one or more blocks in a model, such as model 210. The execution sequence may include a sequence in which the blocks may execute. The execution control graph may be an acyclic directed graph that contains one or more nodes where a node may correspond to one or more blocks contained in the model. The nodes may be connected in the execution control graph using directed edges which may be used to indicate an execution relationship between the nodes. The directed edges may be shown as arrows which may be used to indicate a flow of execution through the graph. An edge from a first node to a second node may indicate that the first node may instruct the second node to execute (fire). This relationship between nodes may be referred to as a parent-child relationship where a parent node may instruct a child node to execute. Examples of models and execution control graphs that may be generated from the models will be described further below with respect to FIGS. 10A-C, and 11A-C.

A node may be associated with a firing semantic. A firing semantic may be used to describe a relationship between incoming edges and output going edges for a node. The firing semantic may be based on functionality associated with a block in a model that corresponds to the node. The firing semantic may be modeled according to a semantic associated with a block corresponding to the node. As will be described further below, one or more Boolean expressions may be used to represent a firing semantic associated with a node.

Figure 3A:
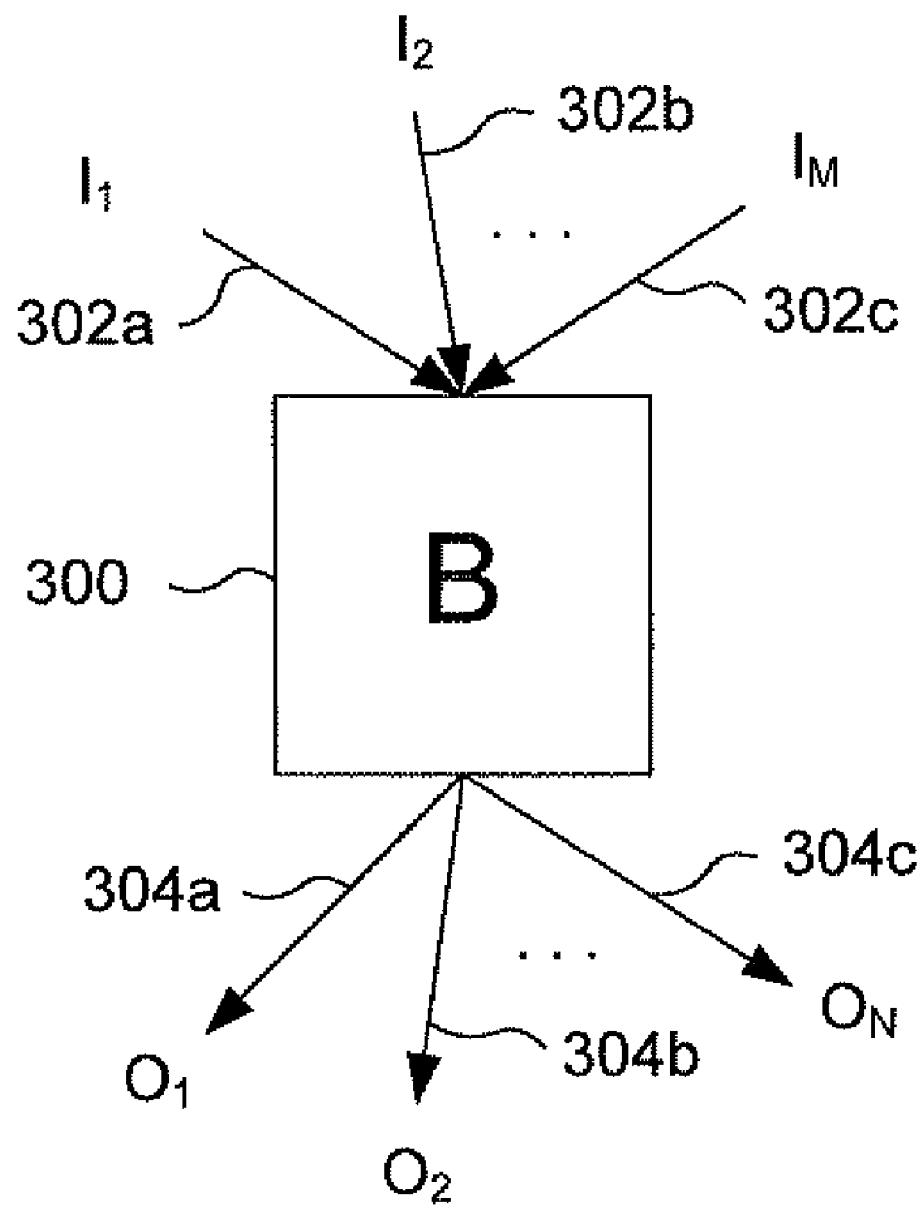

FIG. 3A illustrates a general depiction of a firing semantic that may be associated with a node 300 that is named "B". Referring to FIG. 3A, incoming edges 302 may correspond to inputs to node B 300 and may be represented as arrows pointing toward node B 300. The outgoing edges 304 may correspond to outputs from node B 300 and may be represented as arrows pointing away from node B 300.

Each edge may be represented by a Boolean variable. For example, in FIG. 3A, incoming edges 302*a*, 302*b*, and 303*c* may be represented by Boolean variables $I_1$, $I_2$, and $I_M$, respectively. Likewise, edges 304*a*, 304*b*, and 304*c* may be represented by Boolean variables $O_1$, $O_2$, and $O_N$, respectively.

Operations contained in the Boolean expressions may be represented by various logic notations. Table 1, illustrates logic notations that can be used to represent operations in Boolean expressions described herein.

TABLE 1

Logic Notations of Operations in Boolean Expressions

| Notation | Operation |
| --- | --- |
| → | Implies |
| ↔ | if and only if |
| ∧ | logical AND |
| ∨ | logical OR |
| ¬ | logical NOT |

The firing semantics for a node may reflect (1) input conditions that are necessary for a node to fire and (2) consequent outputs that are produced when the node fires. A node may be said to fire if certain requisite input conditions for the node are met. A node that fires may fire one or more of its outputs.

Figure 3B:
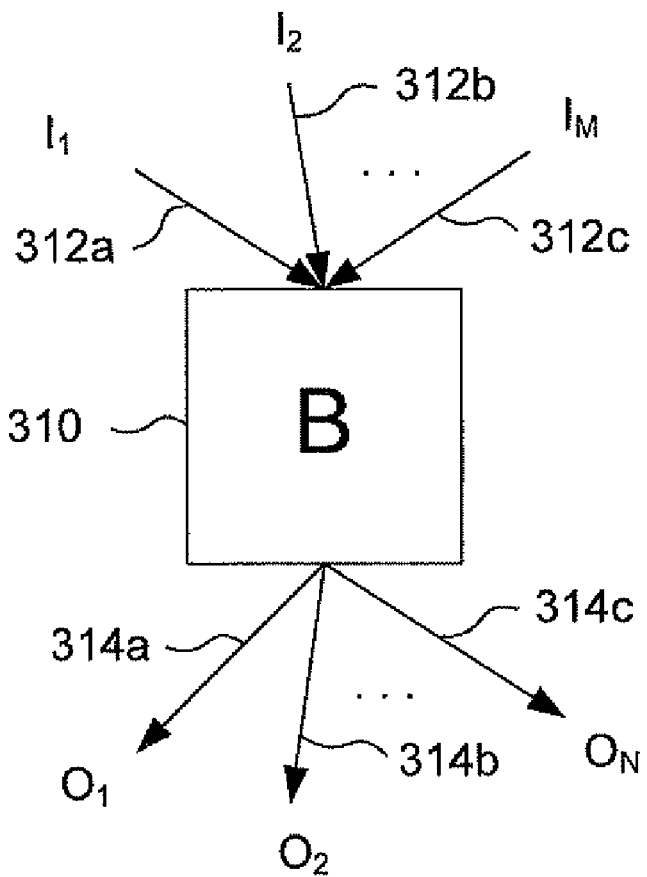

For example, FIG. 3B illustrates an example of a firing semantic associated with a node 310 named "B" that may correspond to a conditional subsystem block in a model, such as model 210. A conditional subsystem block may be a block that may have one or more inputs and one or more outputs. The block may be configured such that if one of the inputs to the block receives an activation signal (e.g., a logical TRUE), and the block outputs an activation signal at all of its outputs and, if none of the block's inputs receives an activation signal, then the block does not output an activation signal at any of its outputs. Rather, the block may output a deactivation signal (e.g., a logical FALSE) at one or more of its outputs.

Referring to FIG. 3B, node B 310 comprises one or more inputs 312 and one or more outputs 314. The inputs 312 are represented by variable names $I_1$ through $I_M$ and the outputs 314 are represented by variable names $O_1$ through $O_N$. A relationship between node B's inputs 312 and node B's outputs 314 is such that all of node B's outputs 314 fire if at least one of node B's inputs 312 fires. This behavior is represented in the Boolean expressions 316.

Specifically, the Boolean expression $I_1 \vee I_2 \vee \ldots \vee I_M \leftrightarrow B$ indicates that firing any of the node B's inputs $I_1$ 312*a* through $I_M$ 312*c* implies that node B 310 fires. Likewise, this Boolean expression also indicates that node B 310 firing implies that at least one input 312 has fired.

The Boolean expression $B \rightarrow O_1 \wedge O_2 \wedge \ldots \wedge O_N$ indicates that node B 310 firing implies that all of node B's outputs 314 fire. The Boolean expressions $O_1 \rightarrow B$, $O_2 \rightarrow B$, and $O_N \rightarrow B$ indicate a particular output 314 firing implies that node B 310 has fired. For example, the Boolean expression $O_1 \rightarrow B$ indicates that output $O_1$ 314*a* firing implies that node B 310 has fired.

Figure 3C:
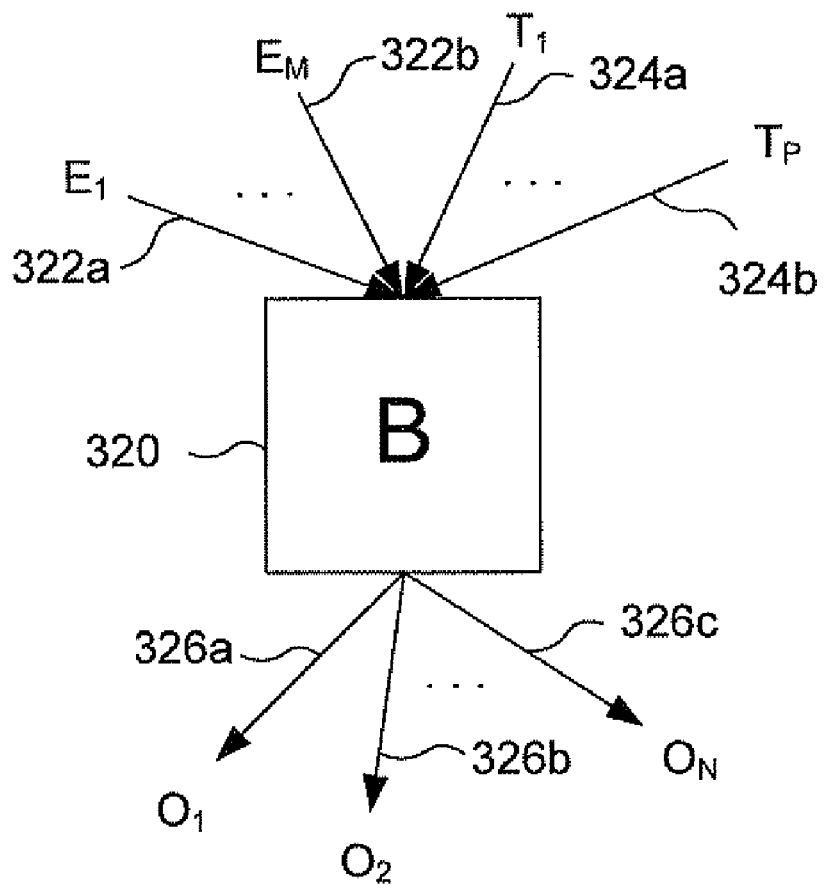

FIG. 3C illustrates an example of a firing semantic associated with a node 320 named "B" that may correspond to an enabled and triggered subsystem block in a model, such as model 210. An enabled and triggered subsystem block may include one or more enable inputs, one or more trigger inputs, and one or more outputs. The block may be configured such that if an activation signal is received by at least one enable input and at least one trigger input, then the block outputs an activation signal at all of its outputs; and if none of the enable inputs or none of the trigger inputs receive an activation signal, then the block does not output an activation signal at any of its outputs.

Referring to FIG. 3C, node B 320 comprises one or more enable inputs 322, one or more trigger inputs 324, and one or more outputs 326. The enable inputs 322 are represented by the variable names $E_1$ through $E_M$, the trigger inputs 324 are represented by the variable names $T_1$ through $T_p$, and the outputs 326 are represented by the variable names $O_1$ through $O_N$. Relationships between node B's enable inputs 322, trigger inputs 324, and outputs 326 are represented in the Boolean expressions 328.

Specifically, the Boolean expression $(E_1 \vee \ldots \vee E_M) \wedge (T_1 \vee \ldots \vee T_M) \leftrightarrow B$ indicates that at least one enable input 322 and at least one trigger input 324 firing implies that node B 320 fires Likewise, this Boolean expression also indicates that node B 320 firing implies that at least one enable input 322 and at least one trigger input 324 have fired.

The Boolean expression $B \rightarrow O_1 \wedge O_2 \wedge \ldots \wedge O_N$ indicates that node B 320 firing implies all of the outputs 326 fire. The Boolean expressions $O_1 \rightarrow B$, $O_2 \rightarrow B$, and $O_N \rightarrow B$ indicate that a particular output 326 firing implies that node B 320 has fired. For example, the Boolean expression $O_1 \rightarrow B$ indicates that output $O_1$ 326*a* firing implies that node B 320 has fired.

FIG. 3D illustrates an example of a firing semantic associated with a node 330 that may correspond to an if block or switch/case block in a model, such as model 210. An if block may have an input port and one or more output ports, where one of the output ports may indicate whether a condition associated with the block is satisfied.

A switch/case block may have a single input port and one or more output ports. A particular output port may output an activation signal depending on the value of a signal present at the input port.

Referring now to FIG. 3D, node B 330 comprises one input 332 and one or more outputs 334. The input 332 is represented by the variable name $I_1$ and the outputs 326 are represented by the variable names $O_1$ through $O_N$. A relationship between node B 330, input 332, and outputs 334 is that if input 332 fires, node B 330 fires, and at most one of node B's outputs 324 fires. This behavior is represented in Boolean expressions 336.

Specifically, the Boolean expression $B \leftrightarrow I_1$ indicates that node B 330 firing implies that the input $I_1$ 332 has fired and vice-versa. The Boolean expression
$B \rightarrow (O_1 \wedge \neg O_2 \wedge \ldots \wedge \neg O_N) \vee (\neg O_1 \wedge O_2 \wedge \ldots \wedge \neg O_N) \vee \ldots \vee (\neg O_1 \wedge \neg O_2 \wedge \ldots \vee O_N) \vee (\neg O_1 \vee \neg O_2 \wedge \ldots \wedge \neg O_N)$
indicates that node B 330 firing implies that at most one output 334 fires. The Boolean expressions $O_1 \rightarrow B$, $O_2 \rightarrow B$, and $O_N \rightarrow B$ indicate that a particular output 334 firing implies that node B 330 has fired. For example, the Boolean expression $O_1 \rightarrow B$ indicates that output $O_1$ 334a firing implies node B 330 had fired.

Note that an if block may have a second output port that may indicate whether the condition is not satisfied. This type of if block may be referred to as an if/else block. In addition, a switch/case block may have an output port that may indicate a default condition. Here, the default condition may indicate that none of the cases in the switch/case block were satisfied by the input signal. A relationship between inputs and outputs associated with a node that corresponds to an if/else block or switch/case block with a default condition may be represented by Boolean expressions 338. Boolean expression
$B \rightarrow (O_1 \wedge \neg O_2 \wedge \ldots \wedge \neg O_N) \vee (\neg O_1 \wedge O_2 \wedge \ldots \wedge \neg O_N) \vee \ldots \vee (\neg O_1 \wedge \neg O_2 \wedge \ldots \wedge O_N)$
indicates that the node B 330 firing implies that one and only one output 334 fires.

Note that the above node 330 may correspond to a general context controller block that may be present in the model. A general context controller block may include, for example, a Stateflow® stateflow chart or a user-designated block. Stateflow® is a product available from The MathWorks, Inc. A stateflow chart may be configured as a representation of a finite state machine having states and transitions that may form basic building blocks of a system.

Figure 4:
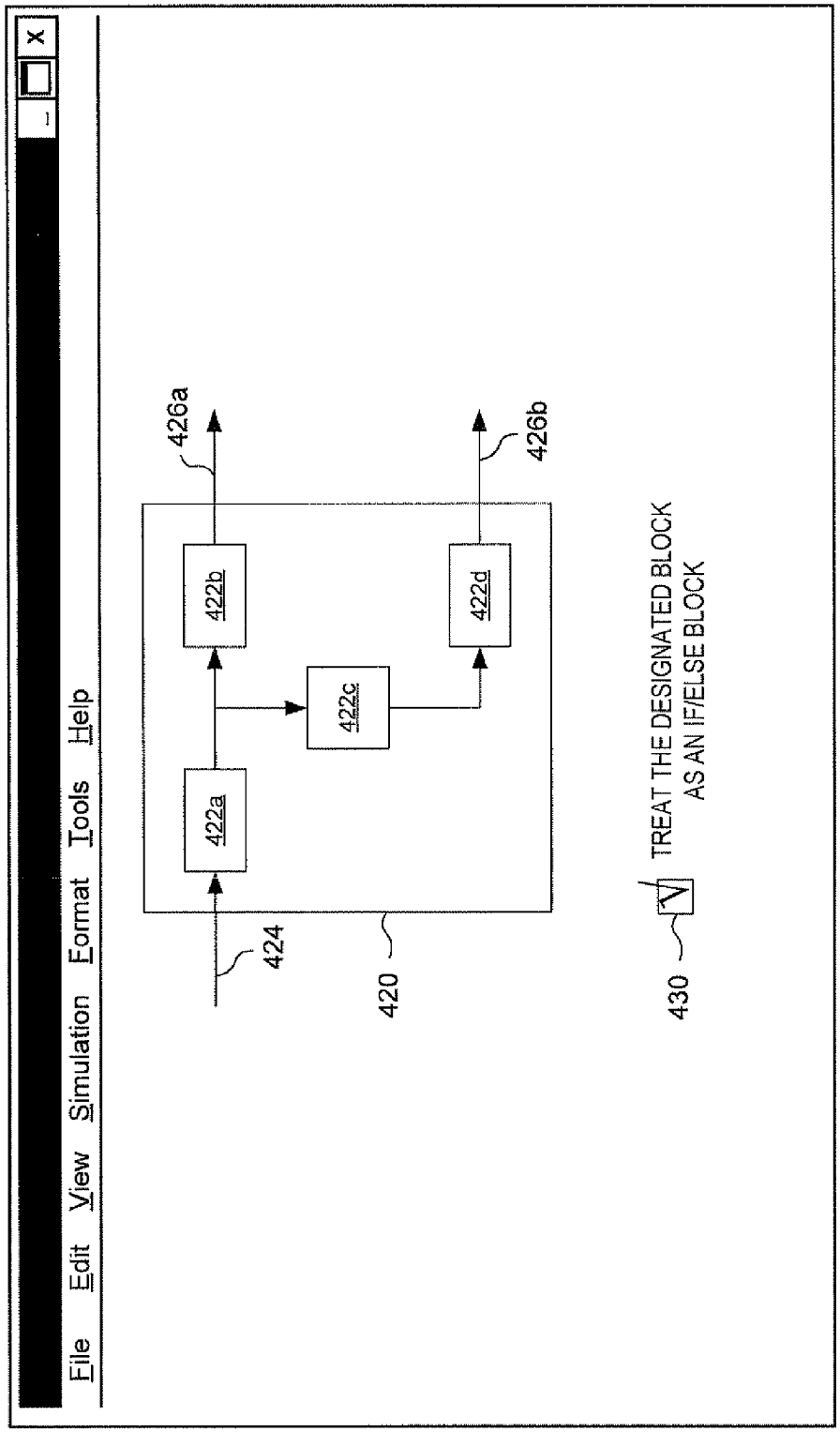
FIG. 4 illustrates an example display of a user-designated block and a checkbox that may be used to specify whether to treat the user-designated block as an if/else block.

A user-designated block may be a block that may be used to group one or more blocks in the model. The blocks may be grouped for purposes of identifying firing semantics for a node, in an execution control graph, that may correspond to the blocks contained in the group. FIG. 4 illustrates an example display 400 of a user-designated block 420 and a checkbox 430 that may be used to specify whether to treat the user-designated block as an if/else block.

Referring to FIG. 4, the user-designated block 420 contains a group of blocks 422 which may be part of a model, such as model 210. A user may, for example, specify that blocks 422 are to be contained in a user-designated block 420 by outlining the blocks 422, selecting the blocks 422, etc. Checkbox 430 allows the user to specify whether the blocks 422 contained in the user-designated block 420 are to be treated as a single if/else block for purposes of determining a firing semantic associated with a node, in an execution control graph, that corresponds to the blocks 422.

For example, suppose blocks 422a-d are part of model 210, a user has specified user-designated block 420 contains blocks 422a-d, and the user has specified that the user-designated block 420 is to be treated as an if/else block. The analyzer 260 may generate a node in an execution control graph that corresponds to the user-designated block 420. The analyzer 260 may treat all of the blocks 422 contained in the user-designated block 420 as a single if/else block for purposes of identifying a firing semantic associated with the node.

A model, such as model 210, may be analyzed to determine if it contains a shared resource. If it is determined that the model contains a shared resource, a dialog box may be displayed to indicate this condition. The dialog box may also be configured to allow a user to specify whether further analysis should be performed (e.g., a diagnostic should be run) to determine if the shared resource is accessed on a mutually exclusive basis.

Figure 5:
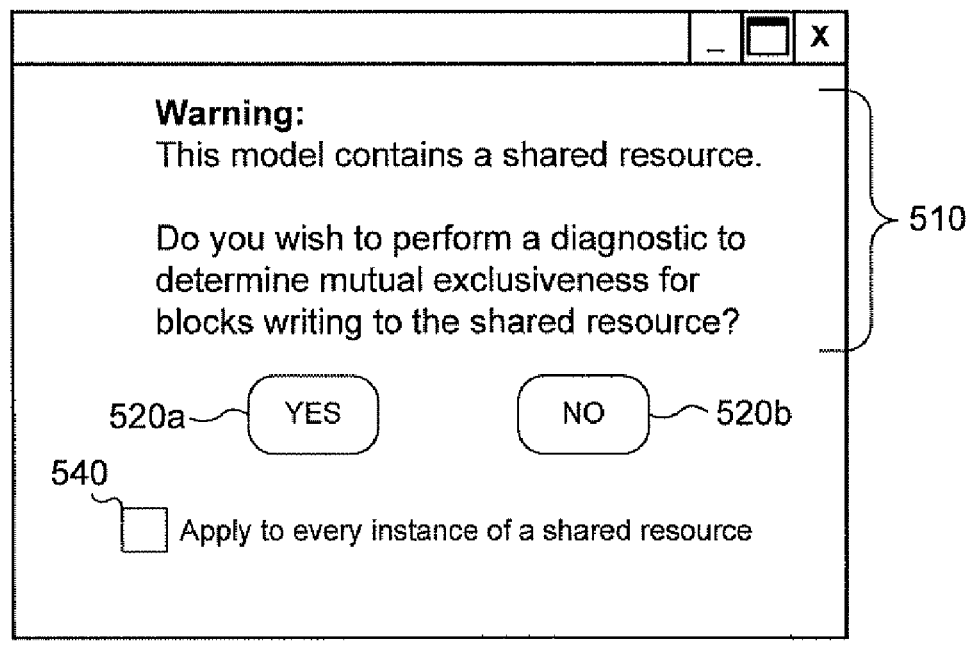
FIG. 5 illustrates an example of a dialog box that may be displayed to indicate that a model contains a shared resource.

FIG. 5 illustrates an example of a dialog box 500 that may be displayed to indicate that a model, such as model 210, contains a shared resource. Referring to FIG. 5, the dialog box 500 may include text 510 that indicates that the shared resource has been detected. The text 510 may also include a query which may be used to determine if analysis (e.g., a diagnostic) should be performed to determine whether the shared resource is accessed on a mutually exclusive basis. The dialog box 500 may include pushbuttons 520 which may be used to answer the query. Specifically, a "YES" pushbutton 520a may be provided to answer "yes" to the query and a "NO" pushbutton 520b may be provided to answer "no" to the query.

The dialog box 500 may also include a checkbox 540 that may be used to specify whether the analysis is to be applied to every instance of a shared resource in the model. Selecting the checkbox 540 may cause the analysis to be applied to each instance of a shared resource in the model to determine whether each instance is accessed on a mutually exclusive basis. It should be noted that other options may be provided to allow some or all shared resources in the model to be analyzed for mutually exclusive access.

Figure 6:
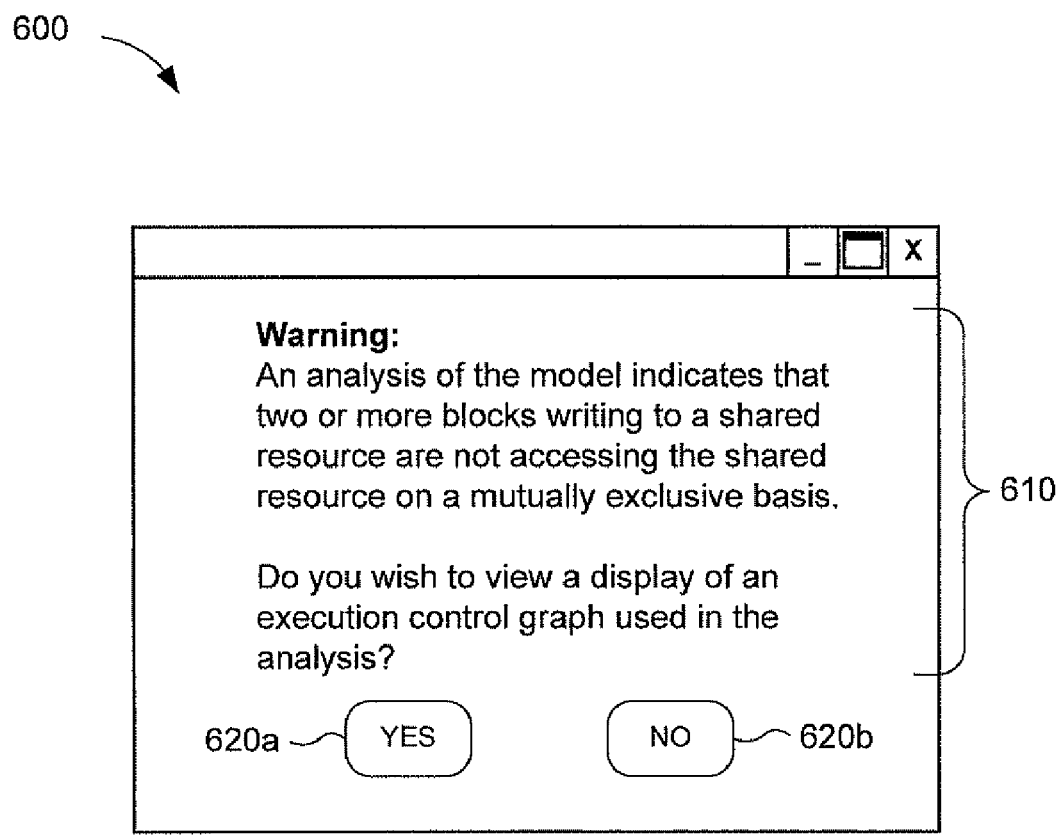
FIG. 6 illustrates an example of a dialog box that may be displayed to indicate that a shared resource in a model is not accessed on a mutually exclusive basis.

If the analysis determines that a shared resource in the model is not accessed on a mutually exclusive basis, an indication of this condition may be displayed, for example, in another dialog box. FIG. 6 illustrates an example of a dialog box 600 that may be displayed to indicate that a shared resource in a model is not accessed on a mutually exclusive basis. Referring to FIG. 6, the dialog box 600 may include text 610 indicating that the resource is not accessed on a mutually exclusive basis. In addition, the text 610 may include a query which may be used to determine if an execution control graph, that may have been generated and used in the analysis, should be displayed. The dialog box 600 may also include pushbuttons 620 which may be used to answer the query. Specifically, a "YES" pushbutton 620a may be provided to answer the query with a "yes" and a "NO" pushbutton 520b may be provided to answer the query with a "no".

Figure 7A:
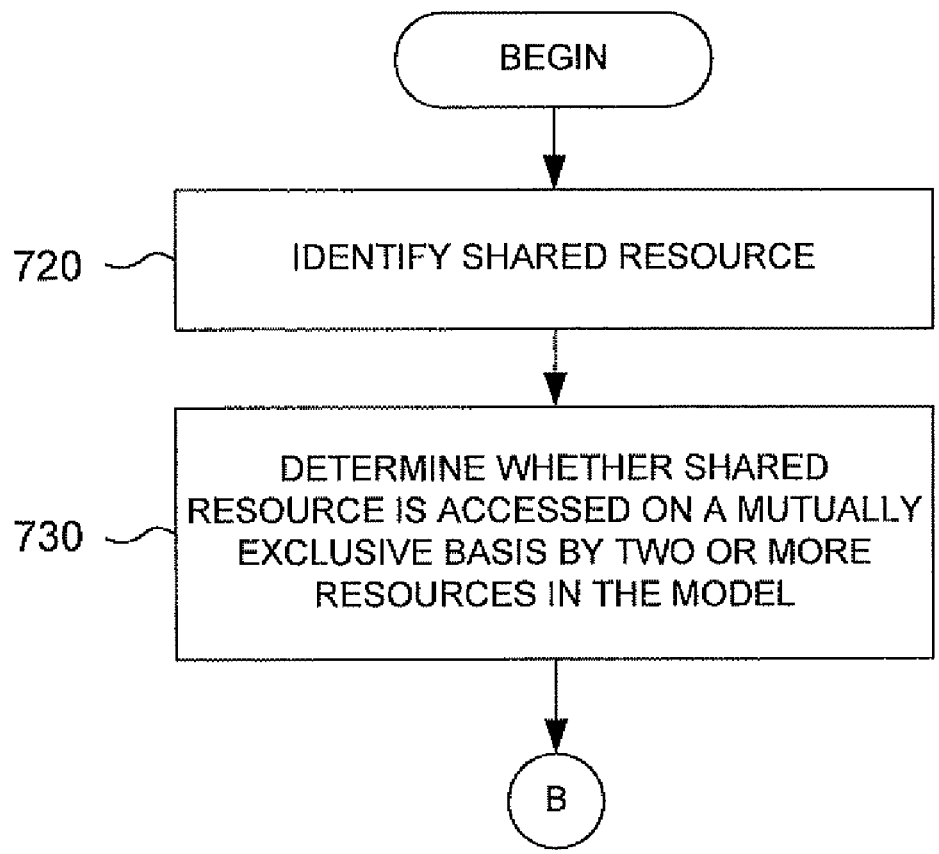
FIGS. 7A-B illustrate a flow chart of example acts that may be used to analyze a model to identify a shared resource in the model, determine if the shared resource is accessed on a mutually exclusive basis by two or more resources in the model, generate a result based on the determination, and output the result.
Figure 7B:
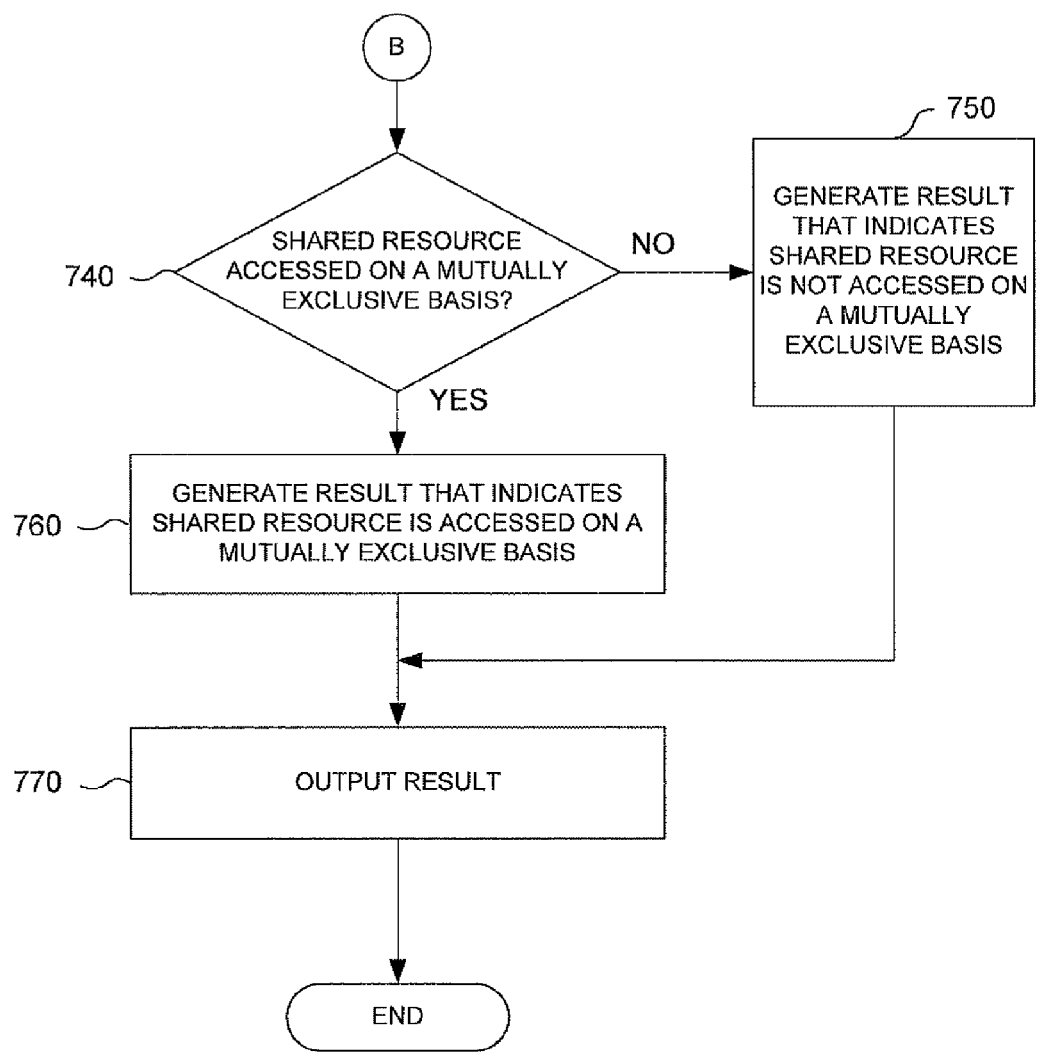

FIGS. 7A-B illustrate a flow chart of example acts that may be performed by one or more embodiments of the invention to analyze a model, such as model 210, to identify a shared resource (e.g., a block) in the model, determine if the shared resource is accessed on a mutually exclusive basis by two or more resources in the model, generate a result based on the determination, and output the result. Referring to FIG. 7A, at block 720, the model is analyzed to identify the shared resource. This analysis may include examining the model to identify resources in the model that may have multiple input ports that may be accessed (e.g., written to) by two or more resources (e.g., other blocks in the model). Examples of blocks that may be configured as shared resources in a model may include merge blocks, certain data store blocks, or other types of blocks that have two or more inputs that may be written by two or more resources.

At block 730, the model is analyzed to determine whether the shared resource is accessed on a mutually exclusive basis by two or more resources (e.g., blocks) in the model. As will be described further below, this analysis may involve generating an execution control graph, generating one or more Boolean expressions based on the execution control graph, generating a conjunction of the Boolean expressions, and determining, based on the conjunction, if the shared resource is accessed on a mutually exclusive basis.

At block 740 (FIG. 7B), a check is performed to determine whether the analysis indicates that the shared resource is accessed on a mutually exclusive basis. If not, a result is generated at block 750 that indicates the shared resource is not accessed on a mutually exclusive basis. Otherwise, at block 760, a result is generated that indicates the shared resource is accessed on a mutually exclusive basis. The result that is generated at either block 750 or block 760 may include a dialog box, such as dialog box 600, a data value, and so on.

At block 770, the result generated at either block 750 or block 760 is outputted. The result may be outputted by, for example, displaying the result on a display device, storing the result in storage (e.g., a memory, disk device, etc.), transferring the result to another device (e.g., over a network), and so on. For example, if the result is a dialog box as described above, the dialog box may be outputted by displaying the dialog box on an output device, such as device 170. Likewise, for example, if the result is a data value the result may be outputted by storing the result in storage, such as primary storage 130 and/or secondary storage 150.

Figure 8:
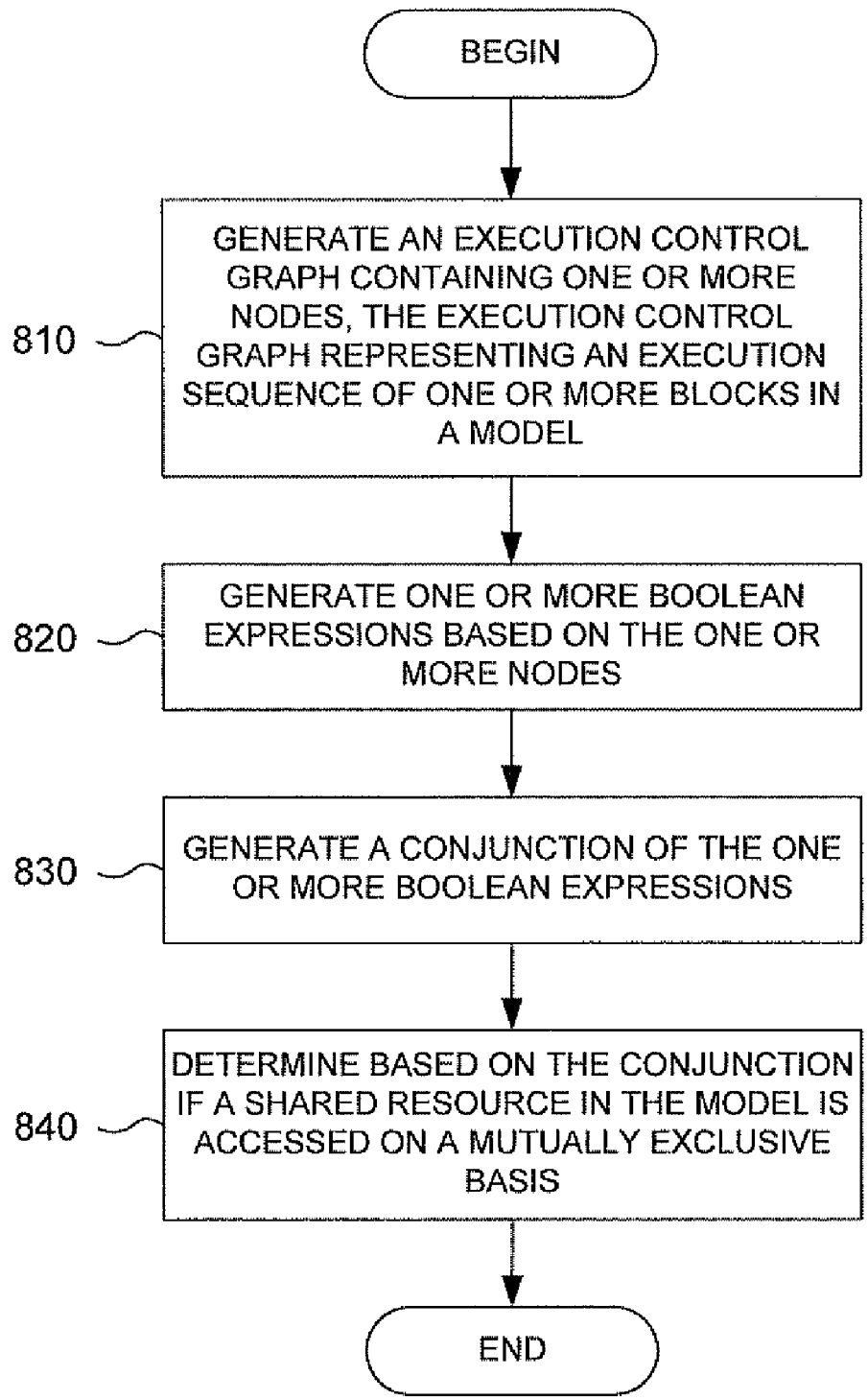
FIG. 8 illustrates a flow chart of example acts that may be used to determine whether a shared resource in a model is accessed on a mutually exclusive basis by two or more resources in the model.

FIG. 8 illustrates a flow chart of example acts that may be performed by one or more embodiments of the invention to determine whether a shared resource in a model, such as model 210, is accessed on a mutually exclusive basis by two or more resources in the model. Referring to FIG. 8, at block 810, an execution control graph that represents an execution sequence of one or more blocks in the model is generated. The one or more blocks may include writer blocks and blocks that control the writer blocks. The generated execution control graph may contain one or more nodes that correspond to the one or more blocks in the model, where the nodes may be arranged to represent the execution sequence of the one or more blocks.

At block 820, one or more Boolean expressions are generated based on the one or more nodes. This act may include identifying firing semantics for the nodes based on the one or more blocks in the model that correspond to the nodes. Boolean expressions for the nodes may be generated based on the identified firing semantics. For example, if a node in the graph corresponds to an if/else block in the model, an identified firing semantic for the node may be the firing semantic described above with respect to FIG. 3D. Boolean expressions generated for the node may include Boolean expressions based on Boolean expressions 336 illustrated in FIG. 3D. In addition, the act at block 820 may include generating a Boolean expression that represents a condition that may be checked to determine whether the shared resource is accessed on a mutually exclusive basis. For example, the shared resource may contain two inputs "A" and "B". A condition to be tested may include whether "A" and "B" may fire (e.g., be a logical TRUE) at the same time. A Boolean expression that may represent this condition may be A^B.

At block 830, a conjunction of the Boolean expressions is generated. The conjunction may be in a conjunctive normal form (CNF). Note that the conjunction may be in other forms, such as, for example, disjunctive normal form (DNF). At block 840, based on the conjunction, a determination is made as to whether the shared resource is accessed on a mutually exclusive basis. This determination may involve determining whether the conjunction is satisfiable by solving a satisfiability (SAT) problem associated with the conjunction. The SAT problem may be stated as: expressing the conjunction as a Boolean expression $f(x_1, x_n)$ is there an assignment of $x_1, \ldots, x_n$ such that f is satisfied (e.g., a logical TRUE). If such an assignment exists, the conjunction may be considered satisfiable and the shared resource may be identified as not being accessed on a mutually exclusive basis. If no such assignment exists, the conjunction may be considered not satisfiable and the shared resource may be identified as being accessed on a mutually exclusive basis. An exhaustive search may be performed to determine whether such an assignment exists.

Figure 9:
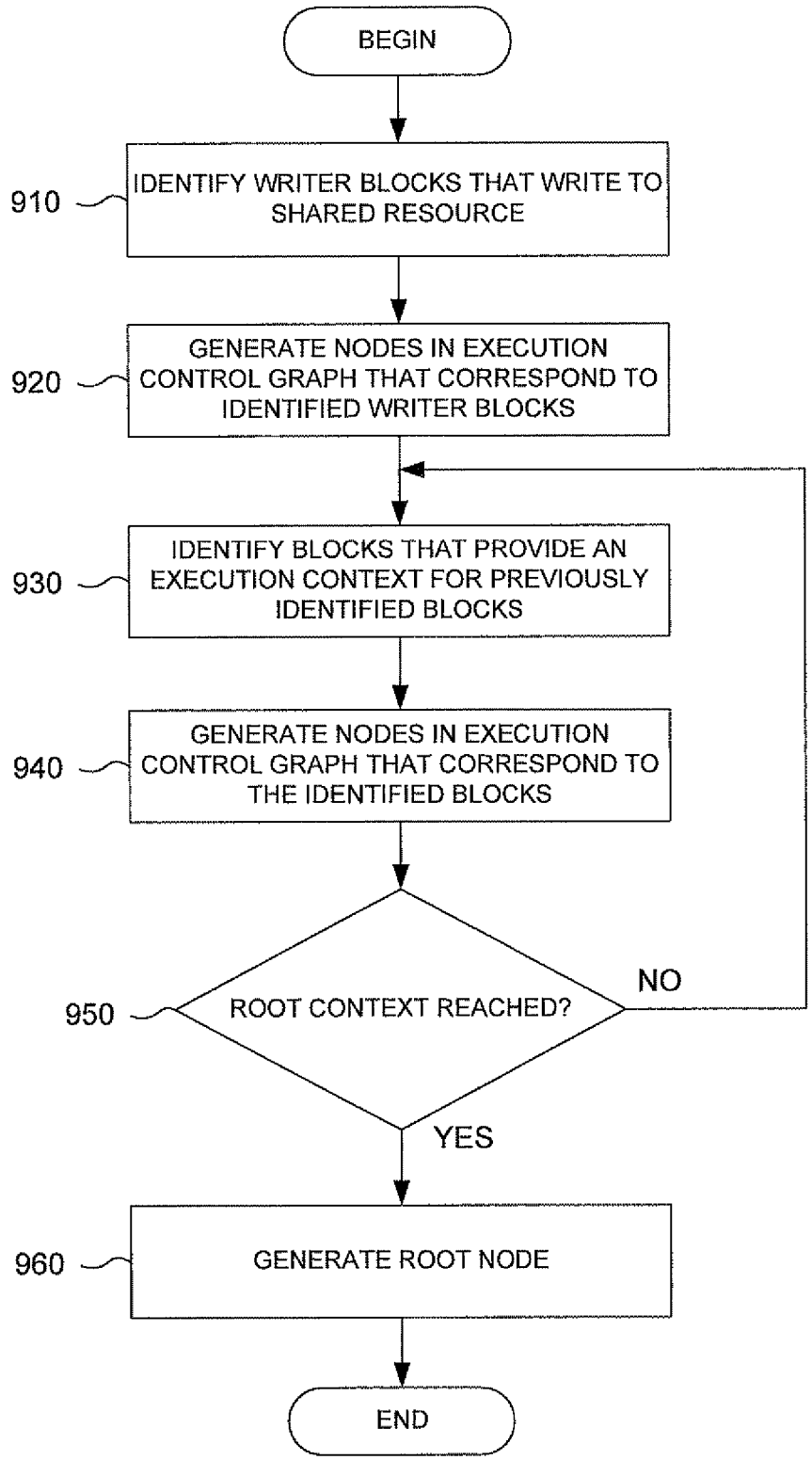
FIG. 9 illustrates a flow chart of example acts that may be used to generate an execution control graph.

FIG. 9 illustrates a flow chart of example acts that may be used by one or more embodiments of the invention to generate an execution control graph associated with a model, such as model 210. Referring to FIG. 9, at block 910, writer blocks that may write to the shared resource are identified. At block 920, nodes that correspond to the identified writer blocks are generated and placed in the execution control graph. At block 930, blocks in the model that provide an execution context for previously identified blocks are identified. Initially, the previously identified blocks are the writer blocks identified at block 910. In successive iterations, the previously identified blocks are the blocks that were identified at block 930 in the previous iteration. At block 940, nodes are generated that correspond to blocks that were identified at block 930 and the generated nodes are placed in the execution control graph.

At block 950, a check is performed to determine if a root context is reached. A root context may relate to a beginning of the execution sequence that is represented by the execution control graph. If the root context has not been reached, the acts at blocks 930 through 950 are repeated until a root context is reached. If the root context has been reached, at block 960 a root node is generated and placed in the execution control graph. Note that the firing semantics associated with the generated nodes may be based on functionality provided by the corresponding blocks.

Figure 10A:
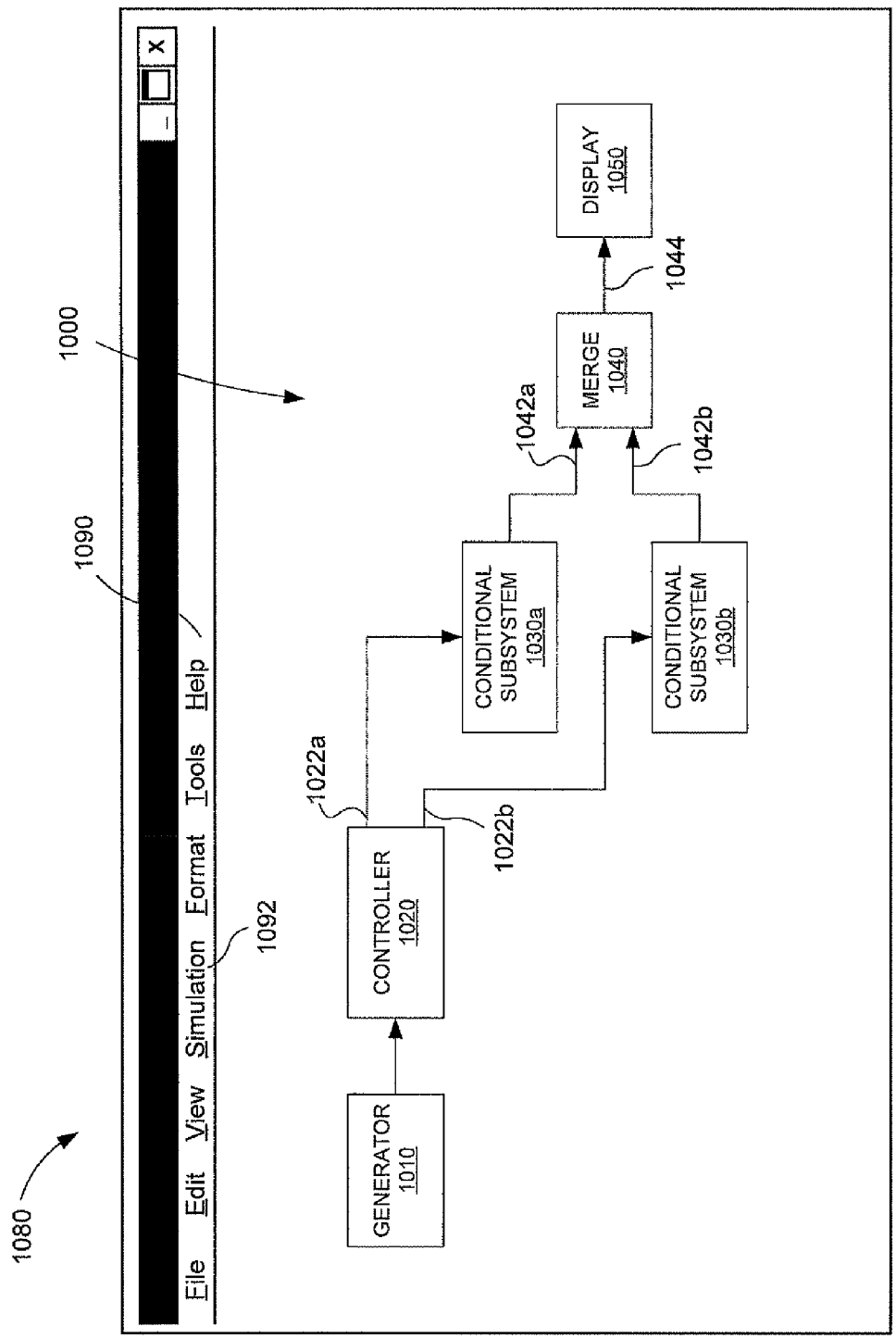
FIGS. 10A-C illustrate an example block diagram of a model containing a shared resource that is accessed on a mutually exclusive basis, an example of a drilled down view of conditional subsystems contained in the model, and an example of an execution control graph that may be derived from the model, respectively.

The following examples may be helpful in understanding concepts described above. FIG. 10A illustrates an example block diagram 1000 of a model containing a shared resource 1040 that is accessed on a mutually exclusive basis. Referring to FIG. 10A, model 1000 may be constructed from a number of blocks 1010-1050 where a block 1010-1050 may represent executable code that may be configured to implement, for example, functionality associated with a system represented by model 1000. The blocks 1010-1050 may be graphically placed in the model 1000 using a TCE, such as TCE 200. The blocks 1010-1050 may be placed, for example, from block libraries, where a block in a block library may be a block designed by a manufacturer of the TCE, a third party, or the user of TCE.

A user may interact with model 1000 through one or more graphical windows 1080 that may be provided by the TCE. Graphical window 1080 may provide an interface through which commands relating to model 1000 may be entered. For example, graphical window 1080 may include a menu bar 1090 that may allow the user to select various menus. The menus may contain menu selections that when selected perform various functions. For example, menu bar 1090 contains a "simulation" menu 1092 which may include a menu selection (not shown) that when selected may start simulation of the model. Likewise, menu 1092 may contain another menu selection (not shown) that when selected may stop simulation of the model. It should be noted that other techniques may be used to enter commands relating to model 1000. For example, a command line interface may be provided, e.g., in a separate window (not shown), that enables commands relating to the model 1000 to be entered.

Model 1000 includes a constant generator 1010, a controller 1020, a first conditional subsystem 1030a, a second conditional subsystem 1030b, a merge block 1040, and a display block 1050. The constant generator 1010 may be configured to generate a constant value, which may be input into controller 1020. The controller 1020 may be configured to determine if the value that is input into the controller 1020 is greater than zero. If the value is greater than zero, the controller 1020 may output an activation signal (e.g., a logical TRUE signal) at a first output 1022a and a deactivation signal (e.g., a logical FALSE signal) at a second output 1022b. Otherwise, if the value is less than or equal to zero, the controller 1020 may output an activation signal at the second output 1022b and a deactivation signal at the first output 1022a. The subsystems 1030 may each be configured to output a particular value in response to an activation signal that may be input into the subsystems 1030 from the controller 1020.

The merge block 1040 may be a shared resource that is shared by the first 1030a and second 1030b conditional subsystems. Merge block 1040 may be configured to function as a shared memory that stores a last value received at its inputs 1042 in a memory. The stored value may be output from the merge block 1040 at its output 1044. The display block 1050 may be configured to display values that are output by the merge block 1040.

Figure 10B:
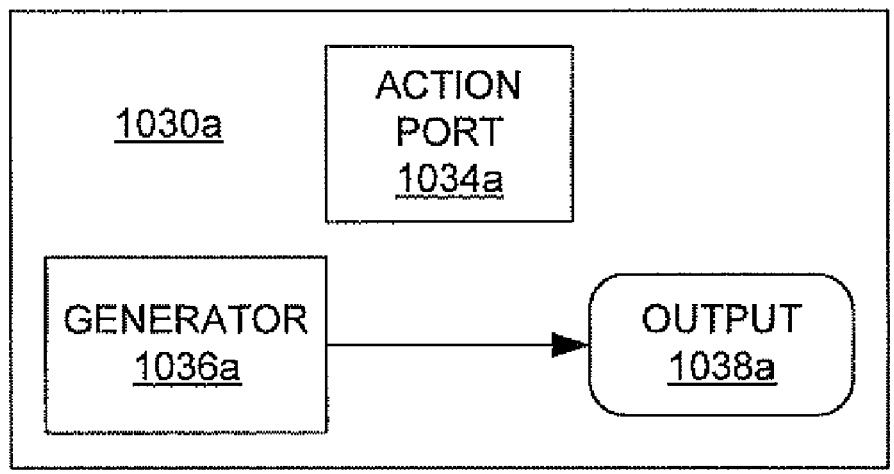
Figure 10B:
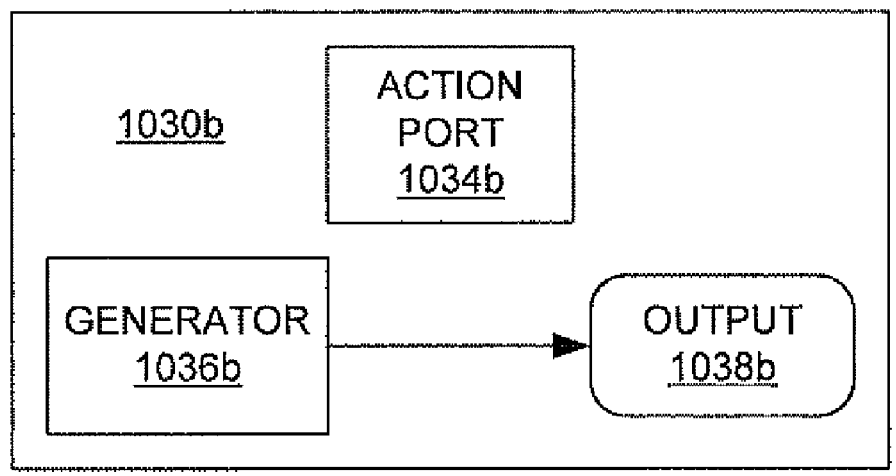

FIG. 10B illustrates a detailed view of conditional subsystems 1030a-b. Referring to FIG. 10B, subsystem 1030a may include an action port 1034a, a constant generator 1036a and an output port 1038a. The action port 1034a allows a control signal to be input into the conditional subsystem 1030a. The control signal may be used to activate/deactivate the conditional subsystem 1030a. For example, the action port 1034a may be configured to activate the conditional subsystem 1030a, if an activation signal is input into the action port 1034a, and deactivate the conditional subsystem 1030a, if a deactivation signal is input into the action port 1034a.

While the conditional subsystem 1030a is activated, the constant generator 1036a may be configured to generate a value (e.g., a constant integer value) and the output port 1038a may be configured to output the value from the subsystem 1030a. Moreover, while the conditional subsystem 1030a is deactivated, the constant generator 1036a may be configured to not generate a value and/or the output port 1038a may be configured to not output a value.

Likewise, conditional subsystem 1030b may include an action port 1034b, a constant generator 1036b, and an output port 1038b. The action port 1030b, constant generator 1036b, and output port 1038b may be configured to perform operations for conditional subsystem 1030b similar to the operations described above for action port 1034a, constant generator 1036a, and output port 1038a, respectively.

Referring now to FIGS. 10A-B, operationally, constant generator 1010 may generate a constant which is input into the controller 1020. The controller 1020 may determine if the constant is greater than zero and, if so, generate (1) an activation signal which is input into conditional subsystem 1030a at its action port 1034a to activate that subsystem 1030a and (2) a deactivation signal which is input into conditional subsystem 1030b at its action port 1034b to cause that subsystem 1030b to deactivate. Otherwise, if the constant is less than or equal to zero, the controller 1020 may generate (1) an activation signal which is input into conditional subsystem 1030b at action port 1034b to activate that subsystem 1030b and (2) a deactivation signal which is input into conditional subsystem 1030a at action port 1034a to deactivate that subsystem 1030a.

While subsystem 1030a is activated, generator 1036a may generate a value which may be output from the subsystem 1030a via output port 1038a. The value may be input into the merge block 1040 at input 1042a Likewise, while subsystem 1030b is activated, generator 1036b may generate a value that may be output from subsystem 1030b via output port 1038b and input into the merge block 1040 at input 1042b. The merge block 1040 may contain storage (e.g., a memory) that may be used to store the last value that is input into the block 1040. In addition, the merge block 1040 may output the stored value via its output 1044. The value output from the merge block 1040 may be input into the display block 1044 which may display the value to, e.g., a user.

Figure 10C:
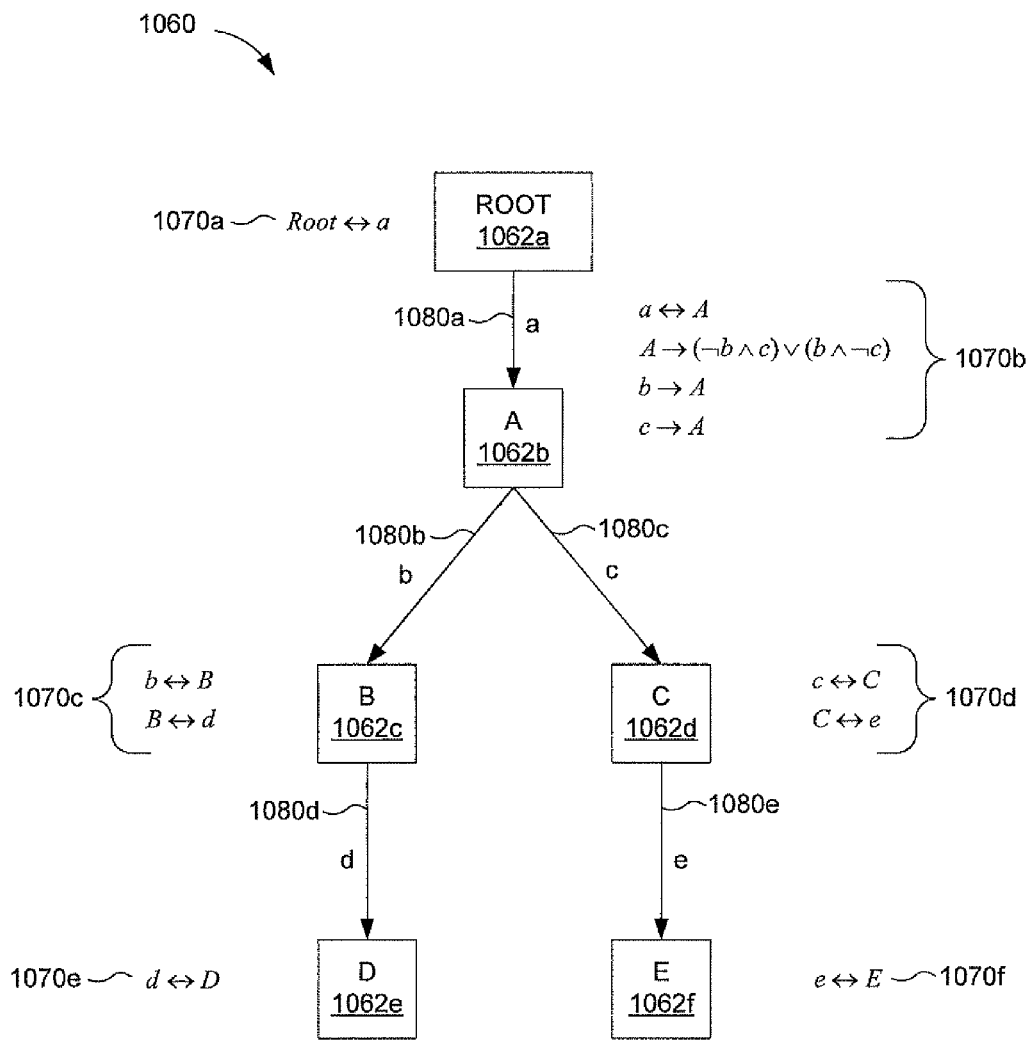

FIG. 10C illustrates an execution control graph 1060 that may be used to represent an execution sequence associated with model 1000. The execution sequence may begin at block 1020 and include blocks 1030a and 1030b in the model 1000.

Referring to FIG. 10C, graph 1060 may be a directed acyclic graph having one or more nodes 1062 connected by one or more edges 1080. A node 1062 may correspond to a particular block in model 1000. For example, nodes 1062b, 1062c, 1062d, 1062e, and 1062f may correspond to blocks 1020, 1030a, 1030b, 1036a, and 1036b in model 1000. The edges 1080 may be used to indicate an execution relationship between the nodes 1062. The edges 1080 may be directed edges that are shown in the graph 1060 as arrows, which may indicate a flow of execution through the graph 1060. An edge 1080 from a first node 1062 to a second node 1062 may indicate that the first node may instruct the second node to execute (fire). For example, edge 1080b may indicate that node 1062b may instruct node 1062c to execute. This relationship between nodes in an execution control graph may be referred to as a parent-child relationship. For example, root node 1062b may be considered a parent to the node 1062c, which, in turn, may be considered a child of node 1062b.

An execution control graph, such as graph 1060, may be generated as described above. Specifically, starting at the shared resource 1040, blocks 1030a and 1030b may be identified as writer blocks to the shared resource 1040, since they supply values that are written to shared resource 1040. Nodes 1062e and 1062f, which correspond to blocks 1030a and 1030b, respectively, are created in graph 1060.

Next, one or more blocks that provide an execution context in which the writer blocks 1030a-b execute are identified and nodes are created that correspond to the identified blocks. In model 1000, blocks 1036a and 1036b execute within an execution context provided by blocks 1030a and 1030b, respectively. Nodes 1062c and 1062d, which correspond to blocks 1030a and 1030b, respectively, are created in the graph 1060.

More specifically, the execution context for block 1036a includes conditional logic provided by block 1030a that enables block 1036a to generate a value. When this conditional logic is satisfied (e.g., a logical TRUE is input into action port 1034a), block 1036a generates a value that is output via output port 1038a. Node 1062c is created to represent this execution context. Likewise, the execution context for block 1036*b* includes the conditional logic provided by block 1030*b* that enables block 1036*b* to generate a value. When this conditional logic is satisfied (e.g., a logical TRUE is input into action port 1034*b*), block 1036*b* generates a value that is output via output port 1038*b*. Node 1062*d* is created to represent this execution context.

Since a root context of the execution sequence has not been reached, one or more blocks that provide an execution context for blocks 1030*a* and 1030*b* are identified. In model 1000, controller block 1020 controls the execution context for blocks 1030*a* and 1030*b* and therefore is identified as a block that provides an execution context for blocks 1030*a* and 1030*b*. Node 1062*b*, that corresponds to controller block 1020, is created in the graph 1060. Since block 1020 is the beginning of the execution sequence, the root context of the execution sequence has been reached. Root block 1062*a* is created to represent the root context.

As noted above, a node in an execution control graph may be associated with a firing semantic. A firing semantic for a particular node may depend on functionality associated with a block in a model that corresponds to the node. For example, in model 1000, controller 1020 may be an if/else block. A firing semantic associated with node 1062*b*, which corresponds to block 1020, may be similar to the firing semantic described above for an if/else block.

One or more Boolean expressions may be generated for a node, in an execution control graph, based on a firing semantic associated with the node. In FIG. 10C, Boolean expressions 1070*a-f* may be generated based on the firing semantics associated with nodes 1062*a-f*, respectively. For example, as noted above, node 1062*b* represents controller 1020, which is an if/else block. Boolean expressions 1070*b* may be generated based on the firing semantic associated with an if/else block that was described above with respect to FIG. 3D.

In addition, a Boolean expression may be generated for a condition to be checked, which may be whether a shared resource in a model is accessed on a mutually exclusive basis. In model 1000, this condition may be represented by the Boolean expression $D \wedge E$.

A Boolean expression that represents a conjunction of the above generated Boolean expressions may be generated. For example, a Boolean expression that may represent a conjunction of the above generated Boolean expressions may be:

(Root$\leftrightarrow$a)$\wedge$(a$\leftrightarrow$A)$\wedge$(A$\rightarrow$($\leftrightarrow$b$\leftrightarrow$c)$\wedge$(b$\wedge$$\wedge$c))$\leftrightarrow$(b$\rightarrow$)$\neg$(c$\rightarrow$A)$\wedge$(b$\wedge$B)$\wedge$(B$\leftrightarrow$d)$\vee$(c$\neg$C)$\wedge$(C$\wedge$e)$\wedge$(d$\leftrightarrow$D)$\wedge$(e$\leftrightarrow$E)$\wedge$(D$\wedge$E)

The Boolean expression that represents the conjunction may be analyzed to determine if the conjunction is satisfiable. That is, the Boolean expression may be analyzed to determine if there is an assignment of values for the Boolean variables in the Boolean expression that satisfies the Boolean expression (e.g., causes the Boolean expression to resolve to a logical TRUE). If such an assignment of values for the Boolean variables exists, the shared resource may be said to not be accessed on a mutually exclusive basis. If no such assignment exists, the shared resource may be said to be accessed on a mutually exclusive basis. In the example Boolean expression above derived from graph 1060, no such assignment exists. Thus, shared resource 1040 is accessed on a mutually exclusive basis.

A result may be generated based on the above determination. The result may be outputted, which, as noted above, may include displaying the result on a display device and/or storing the result in storage. For example, as noted above, the conjunction is not satisfiable, thus, the shared resource 1040 is accessed on a mutually exclusive basis. A result may be a value, text, graphics, and so on that indicates the shared resource is accessed on a mutually exclusive basis. The result may be stored as data in storage, such as primary storage 130 and/or secondary storage 150 and/or displayed on or by an output device, such as output device 170.

Figure 11A:
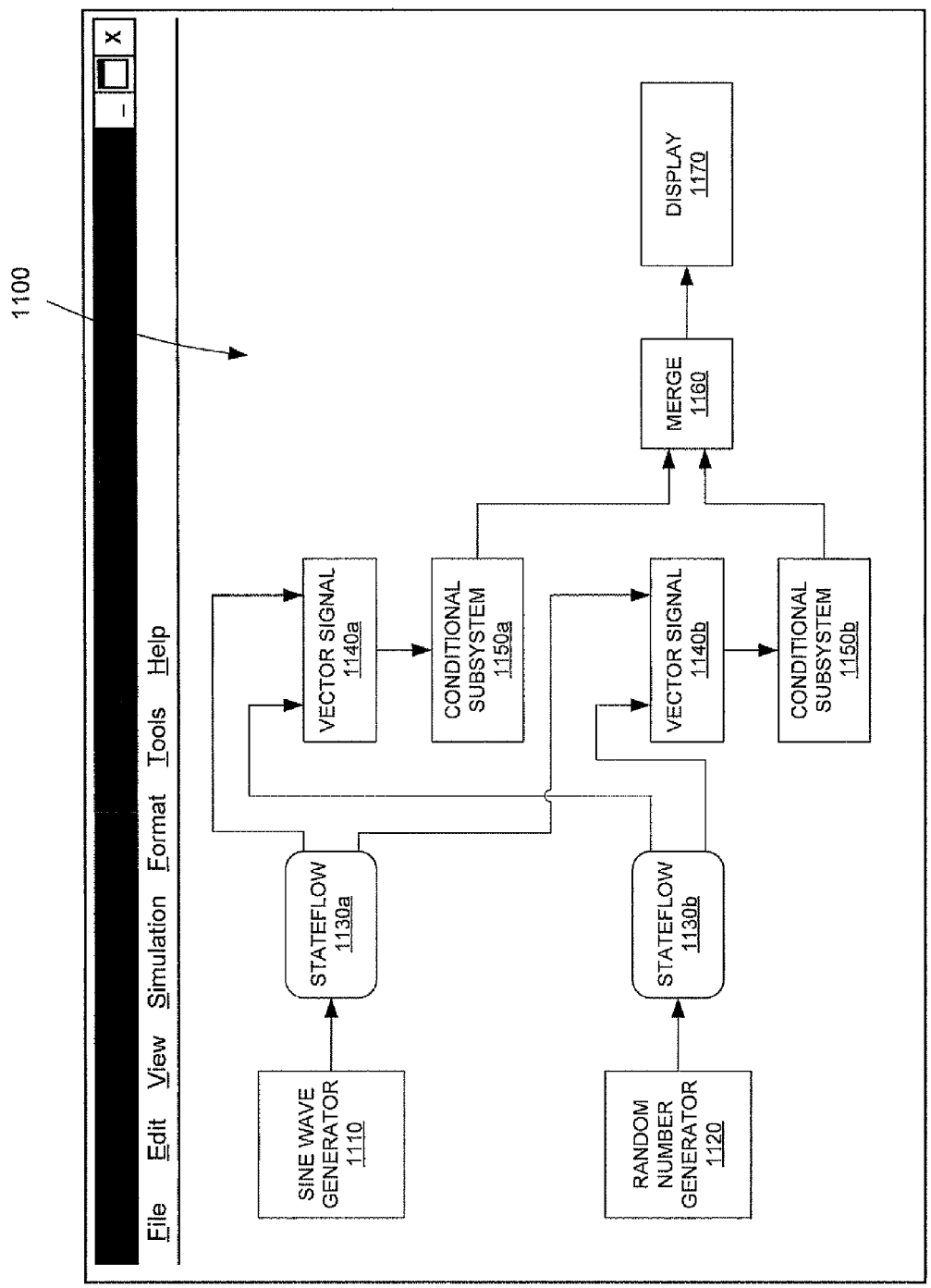
FIGS. 11A-C illustrate an example of a block diagram model containing a shared resource that is not accessed on a mutually exclusive basis, an example of a drilled down view of conditional subsystems contained in the model, and an example of an execution control graph that may be derived from the model, respectively.

FIG. 11A illustrates an example of a block diagram model 1100 containing a shared resource 1160 that is not accessed on a mutually exclusive basis. Referring to FIG. 11A, model 1100 includes a Sine Wave generator 1110, a random number generator 1120, a first Stateflow block 1130*a*, a second Stateflow block 1130*b*, a first vector signal 1140*a*, a second vector signal 1140*b*, a first conditional subsystem 1150*a*, a second conditional subsystem 1150*b*, a merge block 1160, and a display block 1170.

The Sine Wave generator 1110 may be configured to generate a sine wave. The random number generator 1120 may be configured to generate a random value. The first Stateflow block 1130*a* and the second Stateflow block 1130*b* may each be provided with an option that may be used to, e.g., specify that the subsystem is to be treated as an if/else block, as described above.

Assuming the first Stateflow block 1130*a* and the second Stateflow block 1130*b* are treated as if/else blocks, the first Stateflow block 1130*a* and the second Stateflow block 1130*b* may issue a first call if a condition of the if/else associated with the blocks 1130*a-b* is met, otherwise the first Stateflow block 1130*a* and the second Stateflow block 1130*b* may issue a second call.

The first vector signal 1140*a* may receive the first call from the first Stateflow block 1130*a* and the second Stateflow block 1130*b*, and may output an activation signal to the first conditional subsystem 1150*a*. The second vector signal 1140*b* may receive a second call from the first Stateflow block 1130*a* and the second Stateflow block 1130*b* and may output an activation signal to the second conditional subsystem 1150*b*. The first conditional subsystem 1150*a* and the second conditional subsystem 1150*b* may be configured to output a particular value in response to an activation signal that is input into the particular subsystem 1150.

The merge block 1160 may be a shared resource that may be shared by conditional subsystems 1150*a* and 1150*b*. Merge block 1160 may be configured to represent a shared memory that may store a last value received by either of its inputs. The merge block 1160 may output the stored value to the display block 1170 which may be configured to display the value.

Figure 11B:
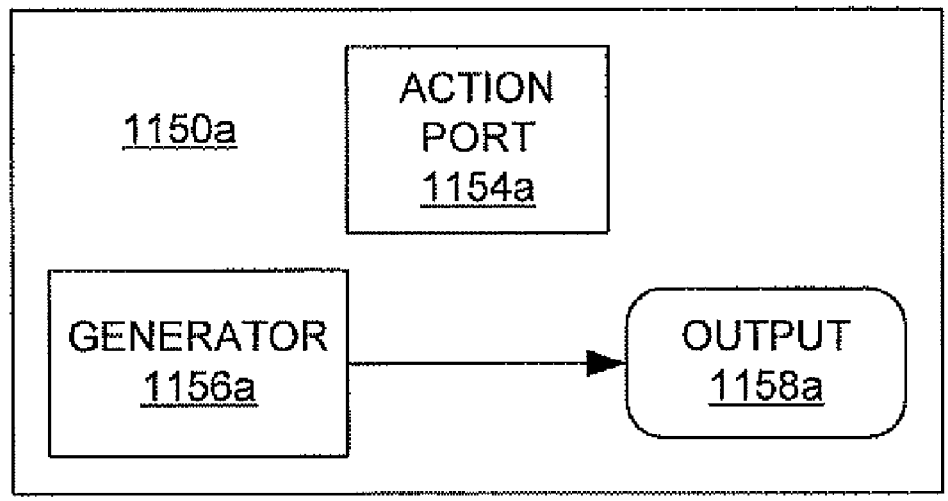
Figure 11B:
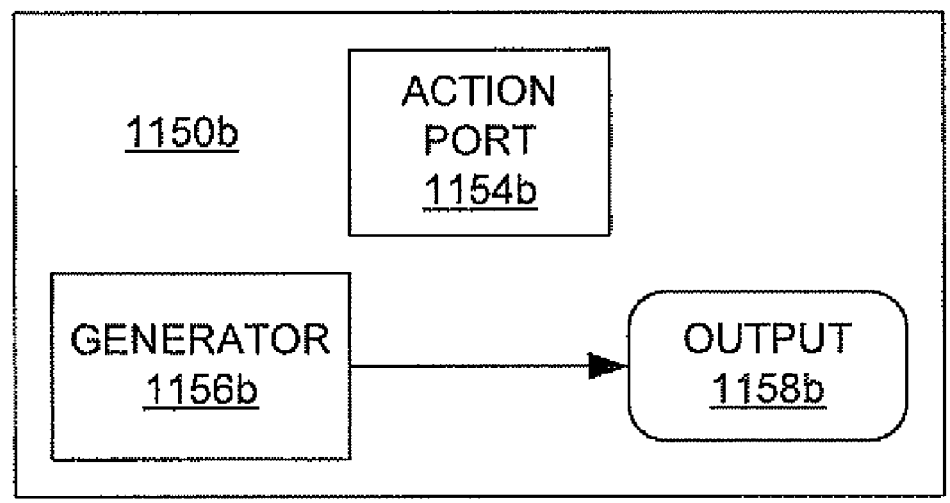

FIG. 11B illustrates details for conditional subsystems 1150*a-b*. Referring to FIG. 11B, subsystem 1150*a* may include an action port 1154*a*, a constant generator 1156*a* and an output port 1158*a*. The action port 1154*a* may be used to activate/deactivate the subsystem 1150*a*, as described above. While the subsystem 1150*a* is activated, the constant generator 1156*a* may generate a value (e.g., a constant integer value) and the output port 1158*a* may be configured to output the value that is generated by the constant generator 1156*a* from the subsystem 1150*a*.

Likewise, conditional subsystem 1150*b* may include an action port 1154*b*, a constant generator 1156*b*, and an output port 1158*b*. The action port 1150*b*, constant generator 1156*b*, and output port 1158*b* may be configured to perform operations for conditional subsystem 1150*b* similar to the operations described above for action port 1154*a*, constant generator 1156*a*, and output port 1158*a*, respectively.

Referring to FIGS. 11A-B, operationally, the Sine Wave generator 1110 may generate a sine wave which may be input into the first Stateflow block 1130*a*. The random number generator 1120 may generate a random value which may be input into the second Stateflow block 1130b. The first Stateflow block 1130a may either output a first call to the first vector signal 1140a or a second call to the second vector signal 1140b. The second Stateflow block 1130b may either output a first call to the first vector signal 1140a or a second call to the second vector signal 1140b.

The first vector signal 1140a may receive first calls from Stateflow blocks 1130a-b and output activation signals to the first conditional subsystem 1150a to activate that subsystem 1150a. The second vector signal 1140b may receive second calls from Stateflow blocks 1130a-b and output activation signals to the second conditional subsystem 1150b to activate that subsystem 1150b.

While activated, subsystem 1150a may output a value that may be written to the merge block 1160 at its first input. Likewise, while activated, subsystem 1150b may output a value that may be written to the merge block 1160 at its second input. The merge block 1160 may store the last value that is written to the merge block 1160. The stored value may be output from the merge block 1160 to the display block 1170, which may display the value.

Figure 11C:
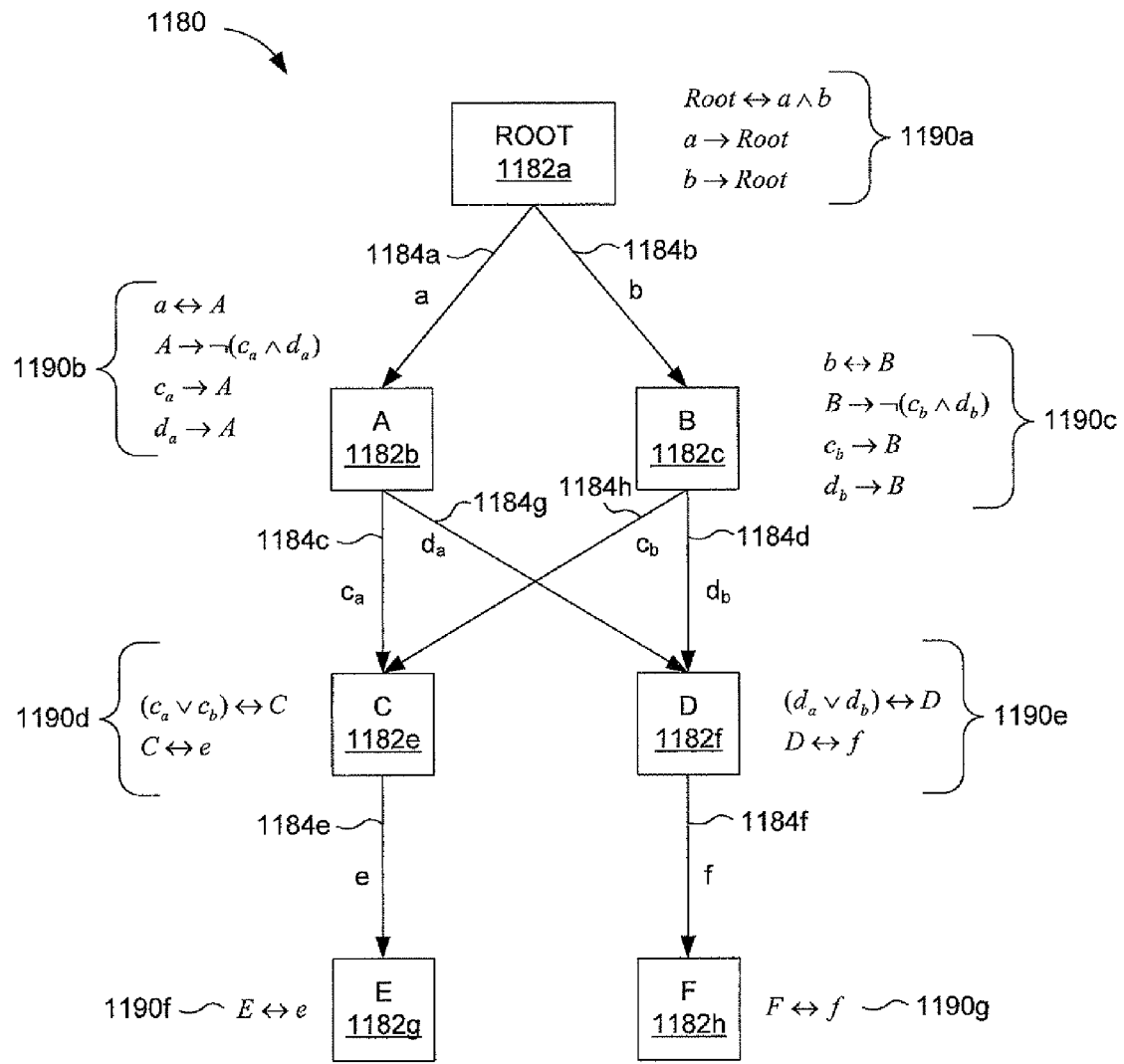

FIG. 11C illustrates an execution control graph 1180 that may be used to represent an execution sequence associated with blocks in model 1100. The execution sequence may begin at blocks 1130a and 1130b and include blocks 1150a and 1150b.

Referring to FIG. 11C, graph 1180 may be a directed acyclic graph having one or more nodes 1182 and one or more edges 1184. A node 1182 may correspond to a particular block in model 1100. For example, nodes 1182b, 1182c, 1182e, 1182f, 1182g, and 1182h may correspond to blocks 1130a, 1130b, 1150a, 1150b, 1156a, and 1156b in model 1100.

As noted above, the edges 1184 may be used to indicate an execution relationship between the nodes 1182. The edges 1184 may be directed edges that are shown as arrows which may indicate a flow of execution through the graph 1180. An edge 1184 from a first node 1182 to a second node 1182 may indicate that the first node may instruct the second node to execute. For example, edge 1184c may indicate that node 1182b may instruct node 1182e to execute. This relationship between nodes may be referred to as a parent-child relationship. For example, node 1182b may be considered a parent to the node 1182e, which may, in turn, be considered a child of node 1182b.

A node 1182 may be associated with a firing semantic, as described above. Boolean expressions 1190a, 1190b, 1190c, 1190d, 1190e, 1190f, and 1190g may be generated based on firing semantics associated with nodes 1182a, 1182b, 1182c, 1182e, 1182f, 1182g, and 1182h, respectively, as described above. In addition, a Boolean expression may be generated for a condition to be checked, which may be whether shared resource 1160 in a model is accessed on a mutually exclusive basis. In model 1100, this condition may be represented by the Boolean expression $E^{\wedge}F$.

A Boolean expression, that represents a conjunction of the above generated Boolean expressions, may be generated, as described above. For example, a Boolean expression that may represent a conjunction of the above generated Boolean expressions may be:

$(Root \leftrightarrow (a \wedge b)) \wedge (a \rightarrow Root) \wedge (b \rightarrow Root) \wedge$
$(a \leftrightarrow A) \wedge (A \rightarrow \neg (c_a \wedge d)_a)) \wedge (c_a \rightarrow A) \wedge (d_a \rightarrow A) \wedge$
$(b \leftrightarrow B) \wedge (B \rightarrow \neg (c_b \vee d_b)) \wedge (c_b \rightarrow B) \wedge (d_b \rightarrow B) \wedge$
$((c_a \wedge c_b) \wedge C) \wedge (C \leftrightarrow e) \wedge ((d_a \leftrightarrow d_b) \wedge D) \leftrightarrow (D \wedge f) \wedge$
$(E \vee e) \leftrightarrow (F \wedge f) \leftrightarrow (E \wedge f)$ The Boolean expression that represents the conjunction may be analyzed to determine if there is an assignment of values, for Boolean variables contained in the Boolean expression, that causes the Boolean expression to be satisfied (e.g., resolve to a logical TRUE). If such an assignment of values for the Boolean variables exists, the shared resource is said to not be accessed on a mutually exclusive basis. In the example Boolean expression above derived from graph 1180, such an assignment exists. Thus, shared resource 1160 is not accessed on a mutually exclusive basis. A result may be generated based on the above determination and the result may be outputted, as described above.

Figure 12:
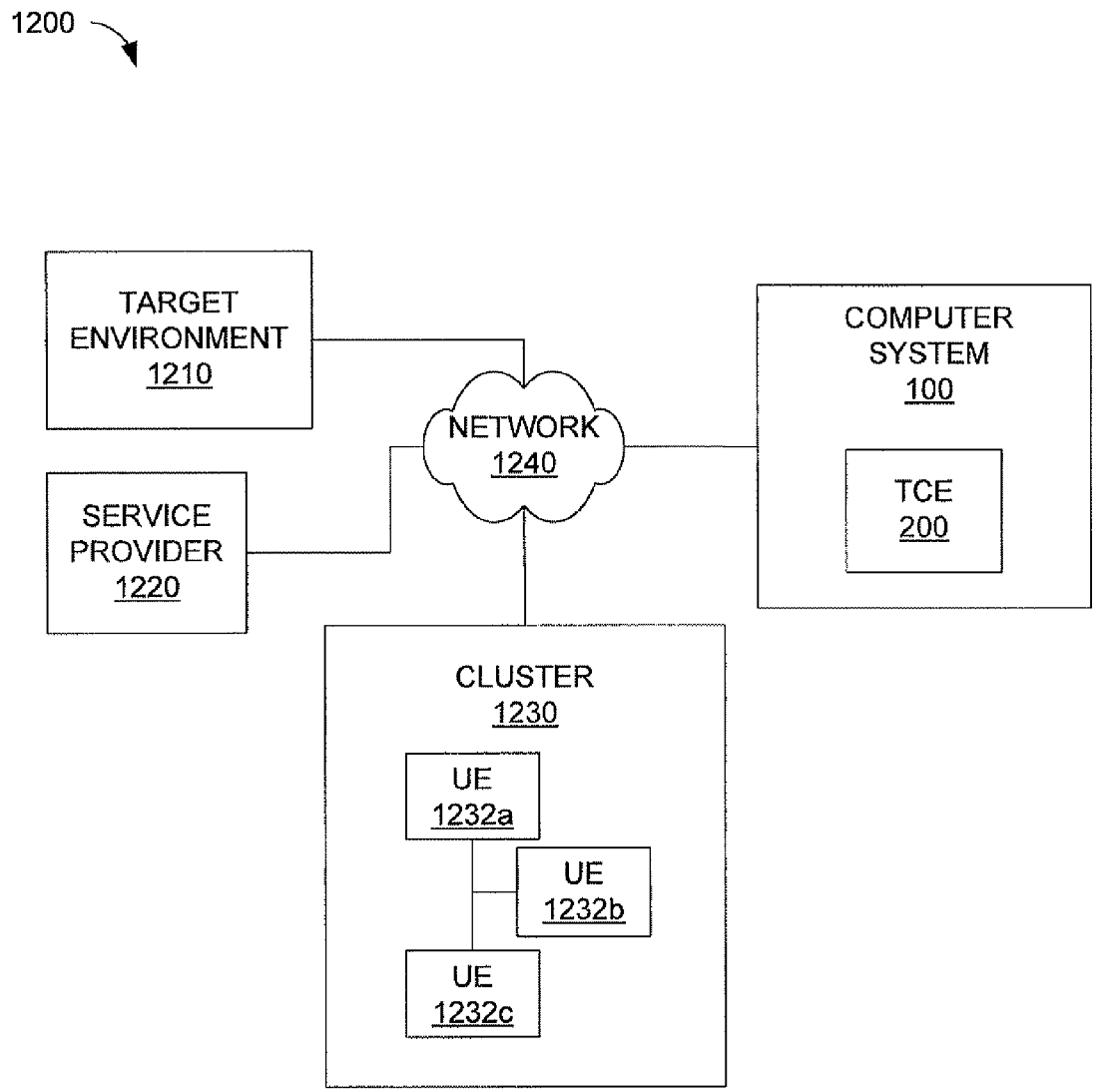
FIG. 12 illustrates an example of a distributed environment that may be configured to implement one or more embodiments of the invention.

One or more embodiments of the invention may be implemented in a distributed environment. FIG. 12 illustrates an example of a distributed environment 1200 that may be configured to implement one or more embodiments of the invention. Referring to FIG. 12, environment 1200 may contain various entities including computer system 100, target environment 1210, service provider 1220, cluster 1230, and network 1240. Note that the distributed environment illustrated in FIG. 12 is just one example of an environment that may be used with embodiments of the invention. Other distributed environments that may be used with embodiments of the invention may contain more entities, fewer entities, entities in arrangements that differ from the arrangement illustrated in FIG. 12, and so on.

Details of computer system 100 were described above with respect to FIG. 1. In distributed environment 1200, computer system 100 may be configured to, among other things, exchange information (e.g., data) with other entities (e.g., target environment 1210, service provider 1220, and cluster 1230) in network 1240. Computer system 100 may interface with the network 1240 via communication interface 180.

The network 1240 may include a communication network capable of exchanging information between the entities in the network 1240. The network 1240 may include digital and/or analog aspects. The information may include machine-readable information having a format that may be adapted for use, for example, in the network 1240 and/or with one or more entities in the network 1240. For example, the information may be encapsulated in one or more packets that may be used to transfer the information through the network 1240.

Information may be exchanged between entities using various network protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, etc.

The network 1240 may comprise various network devices, such as gateways, routers, switches, firewalls, servers, address translators, etc. Portions of the network 1240 may be wired (e.g., using wired conductors, optical fibers, etc.) and/or wireless (e.g., using free-space optical (FSO), radio frequency (RF), acoustic transmission paths, etc.). Portions of network 1240 may include a substantially open public network, such as the Internet. Portions of the network 1240 may include a more restricted network, such as a private corporate network. It should be noted that implementations of networks and/or devices operating on networks described herein are not limited with regards to information carried by the networks, protocols used in the networks, the architecture/configuration of the networks, etc.

The service provider 1220 may include logic (e.g., software) that makes a service available to another entity in the distributed environment 1200. The service provider 1220 may also include a server operated by, for example, an individual, a corporation, an educational institution, a government agency, and so on, that provides one or more services to a destination, such as computer system 100. The services may include software containing computer-executable instructions that implement one or more embodiments of the invention or portions thereof, and may be executed, in whole or in part, by (1) a destination, (2) the service provider 1220 on behalf of the destination, or (3) some combination thereof.

For example, in an embodiment, service provider 1220 may provide one or more subscription-based services that may be available to various customers. The services may be accessed by a customer via network 1240. The customer may access the services using a computer system, such as computer system 100. The services may include services that implement one or more embodiments of the invention or portions thereof. The service provider 1220 may limit access to certain services based on, e.g., a customer service agreement between the customer and the service provider 1220.

The service agreement may allow the customer to access the services that may allow the customer to build, execute, and/or analyze a model, such as model 210, as described above. The service agreement may include other types of arrangements, such as certain fee-based arrangements or restricted access arrangements. For example, a customer may pay a fee which provides the customer unlimited access to a given package of services for a given time period (e.g., per minute, hourly, daily, monthly, yearly, etc.). For services not included in the package, the customer may have to pay an additional fee in order to access the services. Still other arrangements may be resource-usage based. For example, the customer may be assessed a fee based on an amount of computing resources or network bandwidth used.

Cluster 1230 may include a number of units of execution (UEs) 1232 that may perform processing of one or more embodiments of the invention or portions thereof on behalf of computer system 100 and/or another entity, such as service provider 1220. The UEs 1232 may reside on a single device or chip or on multiple devices or chips. For example, the UEs 1232 may be implemented in a single application specific integrated circuit (ASIC) or in multiple ASICs. Likewise, the UEs 1232 may be implemented in a single computer system or multiple computer systems. Other examples of UEs 1232 may include field programmable gate arrays (FPGAs), complex programmable logic devices (CPLDs), application specific instruction-set processors (ASIPs), microprocessors, etc.

The UEs 1232 may be configured to perform operations on behalf of another entity. For example, in an embodiment, the UEs 1232 are configured to execute portions of code associated with the TCE 200. Here, the TCE 200 may dispatch certain activities pertaining to one or more embodiments of the invention to the UEs 1232 for execution. The service provider 1220 may configure cluster 1230 to provide, for example, the above-described services to computer system 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above (e.g., with respect to FIGS. 7A-B, 8, and 9), the order of the acts may be modified in other implementations. Further, non-dependent acts may be performed in parallel.

Also, the term "user", as used herein, is intended to be broadly interpreted to include, for example, a computer system (e.g., a workstation) or a user of a computer system, unless otherwise stated.

It will be apparent that embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as "logic" that performs one or more functions. This logic may be hardware-based, software-based, or a combination of hardware-based and software-based. The logic may be stored in one or more computer-readable storage media and may include computer-executable instructions for execution by processing logic, such as processing logic 120. The computer-executable instructions may be configured to implement one or more embodiments of the invention. The computer-readable storage media may be volatile or non-volatile and may include, for example, flash memories, removable disks, non-removable disks, and so on.

In addition, it should be noted that various electromagnetic signals, such as wireless signals, electrical signals carried over a wire, optical signals carried over optical fiber, etc., may be encoded to carry data and/or computer-executable instructions, configured to implement one or more embodiments of the invention, on, for example, a communication network, such as network 1240.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable storage media for storing instructions, the instructions comprising:
one or more instructions, executable by at least one processor, to:
generate a graph containing one or more nodes the one or more nodes corresponding to at least two blocks in an executable block diagram model, the graph representing an execution sequence of the at least two blocks in the executable block diagram model,
generate one or more Boolean expressions based on the one or more nodes contained in the graph,
generate a conjunction of the one or more Boolean expressions and a Boolean expression that represents a condition, the condition corresponding to two or more blocks of the at least two blocks, in the executable block diagram accessing a shared resource at a same time,
determine whether the shared resource is accessed on a mutually exclusive basis by the two or more blocks in the executable block diagram model based on the conjunction;
generate a result, based on the determination, that indicates whether the shared resource is accessed on the mutually exclusive basis; and
output the result.

2. The one or more computer-readable storage media of claim 1, where the instructions further comprise:
one or more instructions to treat a grouping of one or more blocks in the executable block diagram as an if/else block to generate a node in the graph that corresponds to the grouping of the one or more blocks.

3. The one or more computer-readable storage media of claim 1, where the instructions further comprise:
one or more instructions to identify firing semantics for a node contained in the graph,
the firing semantics identifying a relationship between one or more inputs and one or more outputs of the one or more nodes,
the firing semantics being identified based on types of the one or more blocks in the executable block diagram model that correspond to the node, and
one or more instructions to generate the one or more Boolean expressions from the identified firing semantics.

4. The one or more computer-readable storage media of claim 1, where the conjunction is in a conjunctive normal form.

5. The one or more computer-readable storage media of claim 1, where the shared resource includes at least one of a merge block in the executable block diagram model or a multiple-input data store block in the executable block diagram model.

6. The one or more computer-readable storage media of claim 1, where the instructions further comprise:
one or more instructions to provide the result for display on a display device.

7. The one or more computer-readable storage media of claim 1, where the instructions further comprise:
one or more instructions to store the result in a storage device.

8. The one or more computer-readable storage media of claim 1, where the at least one processor comprises a plurality of processors distributed among a plurality of computing devices.

9. A computer-implemented method comprising:
generating a graph containing one or more nodes, the one or more nodes representing two or more blocks in an executable block diagram model, the graph representing a calling sequence of an execution of the two or more blocks in the executable block diagram model, generating the graph being performed by a computer device;
generating one or more Boolean expressions based on the one or more nodes contained in the graph, generating the one or more Boolean expressions being performed by the computer device;
generating a conjunction of the Boolean expressions and a Boolean expression that represents a condition, the condition corresponding to at least two blocks, of the two or more blocks, in the executable block diagram accessing a shared resource at a same time, generating the conjunction being performed by the computer device;
determining, based on the condition, whether the conjunction of the Boolean expressions indicates whether the shared resource in the executable block diagram model is accessed on a mutually exclusive basis by the at least two blocks in the executable block diagram model, the determining being performed by the computer device;
generating a result based on the determination, the result indicating whether the shared resource is accessed on the mutually exclusive basis, generating the result being performed by the computer device; and
outputting the result, the outputting being performed by the computer device.

10. The computer-implemented method of claim 9, where determining whether the shared resource is accessed on the mutually exclusive basis further comprises:
determining if the conjunction is unsatisfiable or satisfiable based on the condition; and
if the conjunction is unsatisfiable, identifying that the shared resource is accessed on the mutually exclusive basis by the at least two blocks in the executable block diagram model.

11. The computer-implemented method of claim 10, where determining whether the shared resource is accessed on the mutually exclusive basis further comprises:
if the conjunction is satisfiable, identifying that the shared resource is not accessed on the mutually exclusive basis by the at least two blocks in the executable block diagram model.

12. The computer-implemented method of claim 9, where generating the one or more Boolean expressions further comprises:
identifying one or more firing semantics for the one or more nodes contained in the graph, the one or more firing semantics identifying a relationship between one or more inputs and one or more outputs of the one or more nodes; and
generating the one or more Boolean expressions based on the identified one or more firing semantics.

13. The computer-implemented method of claim 9, where the conjunction is in a conjunctive normal form.

14. The computer-implemented method of claim 9, where the shared resource is at least one of:
a merge block in the executable block diagram model, or
a data store block in the executable block diagram model.

15. The computer-implemented method of claim 9, where outputting the result further comprises:
providing the result for display on a display device.

16. The computer-implemented method of claim 9, where outputting the result further comprises:
providing the result for storing in a storage device.

17. An apparatus comprising:
a processor to:
generate a graph containing one or more nodes, the one or more nodes representing two or more blocks in an executable block diagram model, the graph representing a calling sequence of an execution of the two or more blocks in the executable block diagram model,
generate one or more Boolean expressions based on the one or more nodes contained in the graph,
generate a conjunction of the one or more Boolean expressions and a Boolean expression that represents a condition, the condition corresponding to at least two of the two or more blocks in the executable block diagram accessing a shared resource at a same time,
determine, based on the condition, whether the conjunction of the one or more Boolean expressions indicates whether the shared resource in the executable block diagram model is accessed on a mutually exclusive basis by the at least of the two or more blocks in the executable block diagram model,
generate a result based on the determination, the result indicating whether the shared resource is accessed on the mutually exclusive basis, and
output the result.

18. A system comprising:
a storage device; and
a processor to:
generate one or more Boolean expressions based on one or more nodes contained in a graph, the one or more nodes corresponding to at least two blocks in an executable block diagram model, the graph representing an execution sequence of the at least two blocks in the executable block diagram model, generate a conjunction of the one or more Boolean expressions and a Boolean expression that represents a condition, the condition corresponding to two or more blocks, of the at least two blocks, in the executable block diagram accessing a shared resource at a same time, determine whether the shared resource in the executable block diagram model is accessed on a mutually exclusive basis by the two or more blocks in the executable block diagram model based on the conjunction, generate a result, based on the determination, that indicates whether the shared resource is accessed on a mutually exclusive basis, and storing the result in the storage device.

19. One or more non-transitory computer-readable storage media for storing instructions, the instructions comprising:

one or more instructions, executable by at least one processor, to:

generate a graph containing one or more nodes, the one or more nodes representing a plurality of blocks in an executable block diagram model, the graph representing a calling sequence of an execution of the plurality of blocks in the executable block diagram model, generate one or more Boolean expressions based on the one or more nodes contained in the graph, generate a conjunction of the one or more Boolean expressions and a Boolean expression that represents a condition, the condition corresponding to two or more blocks, of the plurality of blocks, in the executable block diagram accessing a shared resource at a same time, determine, based on the conjunction of the one or more Boolean expressions and the Boolean expression that represents the condition, if the shared resource in the executable block diagram model is accessed on a mutually exclusive basis by the two or more blocks in the executable block diagram model, generate a result, based on the determination, that indicates whether the shared resource is accessed on the mutually exclusive basis by the two or more blocks in the executable block diagram model, and provide the result for display on a display device.

20. The one or more computer-readable storage media of claim 19, where the one or more instructions to generate the one or more Boolean expressions include:

one or more instructions to identify one or more firing semantics for the one or more nodes contained in the graph, the one or more firing semantics identifying a relationship between one or more inputs and one or more outputs of the one or more nodes, the one or more Boolean expressions being generated based on the identified one or more firing semantics.

21. The one or more computer-readable storage media of claim 20, where the instructions further comprise:

one or more instructions to treat a grouping of one or more blocks, of the plurality of blocks, in the executable block diagram as an if/else block, and one or more instructions to generate a node, of the one or more nodes, in the graph that corresponds to the grouping of the one or more blocks.

* * * * *